(12) United States Patent
Bosukonda et al.

(10) Patent No.: US 11,415,110 B2
(45) Date of Patent: Aug. 16, 2022

(54) WIND TURBINE BLADE, A METHOD OF CONTROLLING A WIND TURBINE, A CONTROL SYSTEM, AND A WIND TURBINE

(71) Applicant: VESTAS WIND SYSTEMS A/S, Aarhus N (DK)

(72) Inventors: Pradeep Bosukonda, Aarhus V (DK); Tobias Østergaard Rossel, Skødstrup (DK); Johnny Nielsen, Svenstrup J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/254,800

(22) PCT Filed: Jun. 20, 2019

(86) PCT No.: PCT/DK2019/050196
§ 371 (c)(1),
(2) Date: Dec. 21, 2020

(87) PCT Pub. No.: WO2019/242824
PCT Pub. Date: Dec. 26, 2019

(65) Prior Publication Data
US 2021/0262447 A1 Aug. 26, 2021

(30) Foreign Application Priority Data
Jun. 21, 2018 (DK) .............. PA 2018 70422

(51) Int. Cl.
*F03D 17/00* (2016.01)
*F03D 1/06* (2006.01)
*G01S 17/95* (2006.01)

(52) U.S. Cl.
CPC ........... *F03D 17/00* (2016.05); *F03D 1/0675* (2013.01); *G01S 17/95* (2013.01); *F05B 2270/328* (2013.01); *F05B 2270/8042* (2013.01)

(58) Field of Classification Search
CPC ...... F03D 17/00; F03D 1/0675; F03D 7/0224; F05B 2270/328; F05B 2270/8042;
(Continued)

(56) References Cited

U.S. PATENT DOCUMENTS

| 7,938,625 B2 * | 5/2011 | Dahl ...................... H02G 13/00 |
|---|---|---|
| | | 416/146 R |
| 8,139,206 B2 * | 3/2012 | Antoniou .................. G01P 5/26 |
| | | 356/28 |

(Continued)

FOREIGN PATENT DOCUMENTS

| EP | 2327876 A1 | 6/2011 | |
|---|---|---|---|
| WO | 2019242824 A1 | 12/2019 | |
| WO | WO-2020089237 A1 * | 5/2020 | ............... G01P 5/14 |

OTHER PUBLICATIONS

PCT Notification of Transmittal of The International Search Report and The Written Opinion of The International Searching Authority, or The Declaration, Application: 2018P00053WO-RJ, PCT/DK2019/050196, dated Sep. 18, 2019.
(Continued)

*Primary Examiner* — David E Sosnowski
*Assistant Examiner* — Wayne A Lambert
(74) *Attorney, Agent, or Firm* — Patterson + Sheridan, LLP

(57) ABSTRACT

A wind turbine blade is provided comprising a main blade portion and a light detection and ranging (LIDAR) element. The main blade portion has a shell defining an outer aerodynamic surface of the blade. The LIDAR element is disposed within a volume bounded by the outer aerodynamic surface and comprises at least one LIDAR system configured to transmit light beams away from the blade and to detect reflected light beams incident upon the blade.

12 Claims, 15 Drawing Sheets

(58) Field of Classification Search
CPC .......... G01S 17/95; G01S 17/42; G01S 17/58; G01S 17/87; G01S 7/4813; G01S 7/4817; Y02A 90/10; Y02E 10/72
See application file for complete search history.

(56) References Cited

U.S. PATENT DOCUMENTS

| | | | |
|---|---|---|---|
| 8,622,698 B2* | 1/2014 | Kristoffersen | F03D 7/024 |
| | | | 416/37 |
| 10,436,174 B2* | 10/2019 | Holtom | G01P 5/26 |
| 2010/0085557 A1 | 4/2010 | Antoniou et al. | |
| 2012/0056426 A1* | 3/2012 | Van Kuik | F03D 7/0224 |
| | | | 290/44 |
| 2012/0171036 A1 | 7/2012 | Westergaard | |
| 2012/0321462 A1* | 12/2012 | McPherson | F03D 1/0675 |
| | | | 416/1 |
| 2015/0064005 A1 | 3/2015 | Fuglsang et al. | |
| 2015/0122007 A1 | 5/2015 | Olesen | |
| 2016/0146195 A1 | 5/2016 | Holtom | |

OTHER PUBLICATIONS

Danish Patent and Trademark Office, 1st technical examination of patent application 2018P00053DK RJ, dated Dec. 21, 2018.

\* cited by examiner

WIND TURBINE BLADE, A METHOD OF CONTROLLING A WIND TURBINE, A CONTROL SYSTEM, AND A WIND TURBINE

FIELD OF THE INVENTION

The present invention relates to a wind turbine blade, a method of controlling a wind turbine, a control system, and a wind turbine. Specific embodiments relate to wind turbine blades comprising a light detection and ranging (LIDAR) system configured to transmit light beams away from the blade and to detect reflected light beams incident upon the blade.

BACKGROUND OF THE INVENTION

It is known to provide a wind turbine with a rotor having a plurality of pitch-adjustable blades. The wind turbine may include a yawing system for yawing the rotor. Also, the wind turbine may include a pitching system for changing a pitch of the blades. Further, the wind turbine may include a control system coupled to the yawing system and the pitching system so as to yaw the rotor and change the pitch of the blades based on wind parameters, such as, wind speed and wind direction. In this way, wind turbine operation can be modified based on current wind conditions so that wind turbine operation and efficiency can be improved.

Additionally, it is known to fix a light detection and ranging (LIDAR) system onto a nacelle of the wind turbine. In use, the nacelle-mounted LIDAR system is configured to measure wind parameters, such as wind speed and wind direction. For example, the LIDAR system may use the Doppler effect to detect the movement of air and infer wind speed and direction. Specifically, electromagnetic radiation (e.g. a laser beam) is transmitted from the LIDAR system and towards upstream wind. This transmitted radiation is reflected by "aerosols" which are microscopic airborne particulates moving with the wind. The reflection generates scattered radiation some of which travels back to, and is received by, the LIDAR system as backscattered radiation. Wind parameters can be determined by analysing the backscattered radiation received by the LIDAR system. For example, wind velocity (i.e. wind speed and direction) can be determined by measuring a frequency shift of the received backscattered radiation, that is, by measuring a change in frequency between the transmitted radiation and the received backscattered radiation.

It is known to use wind parameter measurements obtained using nacelle-mounted LIDAR systems as inputs to the wind turbine control system. In this way, the control system can cause the rotor to yaw, and/or cause the pitch of the blades to change, based on these wind parameter measurements.

There is a continuing need to improve the accuracy and richness of wind parameter measurements. There is also a continuing need to improve the methods of controlling wind turbines based on measured wind parameters. In this way, wind turbine operation and efficiency can be improved.

SUMMARY OF THE INVENTION

A first aspect of the invention provides a wind turbine blade comprising a main blade portion and a light detection and ranging (LIDAR) element, the main blade portion having a shell defining an outer aerodynamic surface of the blade, wherein the shell comprises at least one aperture extending at least partly through a thickness of the shell, and the LIDAR element being disposed within a volume bounded by the outer aerodynamic surface and comprising a plurality of LIDAR systems configured to transmit light beams away from the blade and to detect reflected light beams incident upon the blade, the plurality of LIDAR systems operatively coupled to a controller, the plurality of LIDAR systems being disposed such that each LIDAR system is operable to transmit and detect light beams at a different angle to each other LIDAR system, the controller being operable to selectively activate each of the plurality of LIDAR systems.

A second aspect of the invention provides a wind turbine blade comprising a main blade portion and a light detection and ranging (LIDAR) element, the main blade portion having a shell defining an outer aerodynamic surface of the blade, and the LIDAR element being disposed within a volume bounded by the outer aerodynamic surface and comprising at least one LIDAR system configured to transmit light beams away from the blade and to detect reflected light beams incident upon the blade, wherein the shell comprises at least one aperture extending at least partly through a thickness of the shell, and wherein the at least one LIDAR system is disposed at least partly within the at least one aperture.

In conventional turbines in which a LIDAR element is provided on the nacelle, a large number of LIDAR beams are needed to cover a large part of the swept area of the blade. If the LIDAR element transmits only two LIDAR beams, for example, and one of the beams is transmitted into the wake of an obstructing feature upstream of the turbine, it is not possible to determine the upstream wind speed and direction. Even if the LIDAR element transmits four LIDAR beams, if one of the side beams is in wake it can be difficult to distinguish wind speed, direction, shear, and veer. Nacelle-mounted LIDAR elements which transmit more than four LIDAR beams are rare and expensive. Additionally, such nacelle-mounted systems suffer from poor reliability in bad weather conditions, and provide invalid data when the blade passes through the LIDAR beams. Thus the wind properties measured by a nacelle-mounted LIDAR element can be inaccurate, and so control of the turbine may be based on inaccurate information. This may even lead to increased loads on the turbine.

In the present invention, the LIDAR system is provided in a blade of the turbine. The LIDAR system thus rotates with the blade, and so can cover the area swept by the blade without requiring multiple LIDAR beams. As such, the present invention avoids the problems associated with nacelle-mounted LIDAR systems.

In some embodiments, the LIDAR element may comprise a plurality of LIDAR systems operatively coupled to a controller, the plurality of LIDAR systems being disposed such that each LIDAR system is operable to transmit and detect light beams at a different angle to each other LIDAR system, the controller being operable to selectively activate each of the plurality of LIDAR systems.

In some embodiments, the or each LIDAR system may be configured to transmit and detect light beams at a single angle.

In some embodiments, the or each LIDAR system may be a pulsed Doppler LIDAR system or may be a continuous-wave Doppler LIDAR system.

In some embodiments, the or each LIDAR system may be positioned at a leading edge region of the main blade portion.

Some embodiments may further comprise one or more additional LIDAR elements, wherein the LIDAR element and each additional LIDAR element is positioned at a different location between a root and a tip of the blade.

In some embodiments, the controller may determine a pitch angle of the blade, and the controller selects one or more appropriate LIDAR systems to perform a LIDAR measurement, and activates the selected LIDAR systems.

A third aspect of the invention provides a wind turbine comprising a plurality of wind turbine blades, wherein at least one of the plurality of wind turbine blades is a wind turbine blade according to any embodiment of the first aspect or the second aspect.

A fourth aspect of the invention provides a wind turbine blade comprising a main blade portion and a light detection and ranging (LIDAR) element, the main blade portion having a shell defining an outer aerodynamic surface of the blade, and the LIDAR element being disposed within a volume bounded by the outer aerodynamic surface and comprising at least one LIDAR system configured to transmit light beams away from the blade and to detect reflected light beams incident upon the blade, wherein the shell comprises at least one aperture extending at least partly through a thickness of the shell and containing optically transparent material, wherein the at least one LIDAR system is disposed within a volume bounded by an inner surface of the shell and is positioned to transmit and detect light beams through the optically transparent material.

As with the first or second aspect, providing the LIDAR system in the blade avoids the problems associated with nacelle-mounted LIDAR systems.

In some embodiments, the optically transparent material may comprise a material through which light beams transmitted by the LIDAR system (i.e. LIDAR signals) can pass without interference. The optically transparent material may comprise a material through which transmitted and reflected LIDAR signals can pass such that a LIDAR measurement can be performed. The transmittance of the optically transparent material at the wavelength or wavelengths of the LIDAR signals may be 0.5 or higher or 0.7 or higher or 0.9 or higher. The optically transparent material may be transparent to light in the near-IR, visible, and/or UV electromagnetic ranges. The optically transparent material may or may not be transparent to visible wavelengths.

In some embodiments, the at least one aperture may comprise an aperture covering a portion of a leading edge region of the main blade portion, the leading edge region being adjacent the LIDAR system.

In some embodiments, the LIDAR element may comprise a plurality of LIDAR systems operatively coupled to a controller, the plurality of LIDAR systems being disposed such that each LIDAR system is operable to transmit and detect light beams at a different angle to each other LIDAR system, the controller being operable to selectively activate each of the plurality of LIDAR systems.

In some embodiments, the or each LIDAR system may be configured to transmit and detect light beams at a single angle. The or each LIDAR system may be a pulsed Doppler LIDAR system or continuous-wave Doppler LIDAR system.

In some embodiments, the or each LIDAR system may be positioned at a leading edge region of the main blade portion.

Some embodiments may further comprise one or more additional LIDAR elements, wherein the LIDAR element and each additional LIDAR element is positioned at a different location between a root and a tip of the blade.

A fourth aspect of the invention provides a wind turbine comprising a plurality of wind turbine blades, wherein at least one of the plurality of wind turbine blades is a wind turbine blade according to any embodiment of the third aspect.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
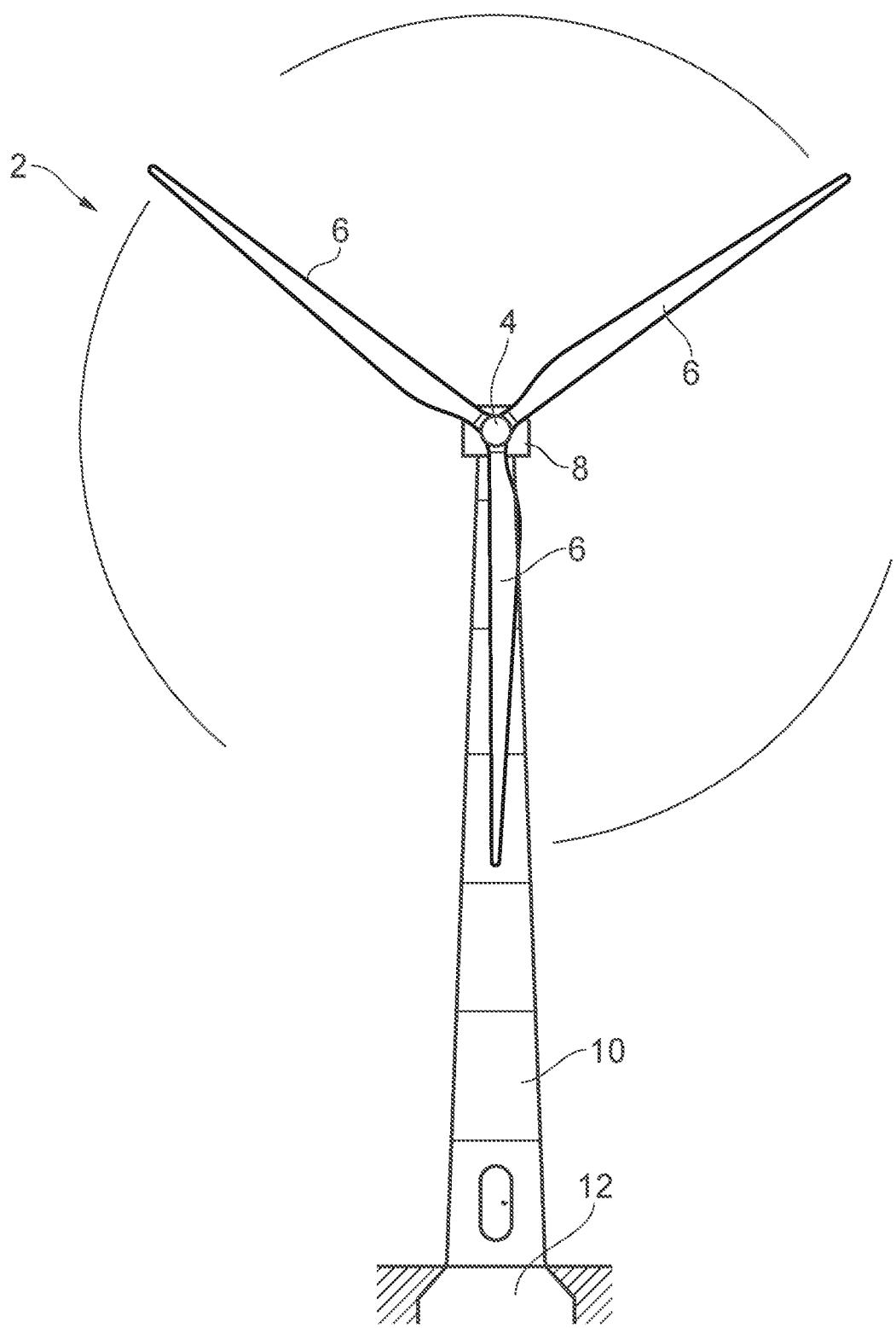
FIG. 1 is a schematic front view of a wind turbine in accordance with an embodiment.

FIG. 1 shows a wind turbine 2 comprising a rotor 4 having a plurality of blades 6. In an embodiment the wind turbine 2 has three blades as shown in FIG. 1, but in some other embodiments, the wind turbine 2 may have a different number of blades, for example, more or less than three blades.

The rotor 4 is mounted to a nacelle 8 which, in turn, is fixed to supporting structure 10 (e.g. a pylon). The supporting structure 10 is fixed to a foundation 12. In an embodiment, the foundation 12 is positioned at least partly below a top surface of the ground—i.e. the wind turbine 2 may be in a land-based environment. However, in some other embodiments, the foundation 12 may be positioned at least partly beneath a surface of a body of water (e.g. a sea or ocean) and may function to fix the supporting structure 10 to a surface (e.g. a sea bed or ocean floor) beneath the body of water—i.e. the wind turbine 2 may be in a marine environment. In yet another embodiment, the foundation 12 may fix the supporting structure 10 to a platform which floats on the body of water.

The nacelle 8 may contain electricity generating equipment (not shown) which couples to the rotor 4. The electricity generating equipment may include a generator, a gearbox, a drive train, and a brake assembly. In operation, when the wind turbine 2 experiences windy conditions meeting certain wind criteria, an aerodynamic profile of the blades 6 generates lift from the wind which causes rotation of the rotor 4 relative to the nacelle 8. The electricity generating equipment then generates electricity from the rotation of the rotor 4. The certain wind criteria may include wind speed within a certain speed range and/or wind direction within a certain direction range.

The wind turbine 2 may include one or more electrical conductors (not shown) for transporting electricity generated by the electricity generating equipment away from the wind turbine 2, such as, for example, to an electrical connection with an electrical grid. in this way, electricity generated by the wind turbine 2 can be collected and distributed by the electrical grid.

Additionally, the wind turbine 2 may include a yawing system (not shown) responsible for controlling an orientation of the rotor 4 towards the wind in response to control signals. Also, the blades 6 may be pitch-adjustable and the wind turbine 2 may include a pitching system (not shown) for changing a pitch of the blades 6 in response to control signals. Further, the wind turbine 2 may include a control system (not shown) operatively coupled to the yawing system and to the pitching system so as to exchange control signals therewith. For instance, the control system may transmit control signals to the yawing system which cause the yawing system to yaw the rotor 4 to a particular orientation. Additionally, the control system may transmit control signals to the pitching system which cause the pitching system to change a pitch of the blades 6 to a particular pitch angle. In an embodiment, the control system may include one or more inputs for receiving wind parameters which are indicative of a state of the wind upstream of the wind turbine 2. The control system may generate its control signals based on these wind parameters so that the wind turbine 2 is controlled (e.g. via rotor 4 yawing or via blades 6 pitching) to enable or improve electricity generation.

Various embodiments provide wind turbine blades for use in wind turbines, such as, for example, the wind turbine 2. Specific embodiments of such wind turbine blades will now be described with reference to FIGS. 2 to 6.

Figure 2:
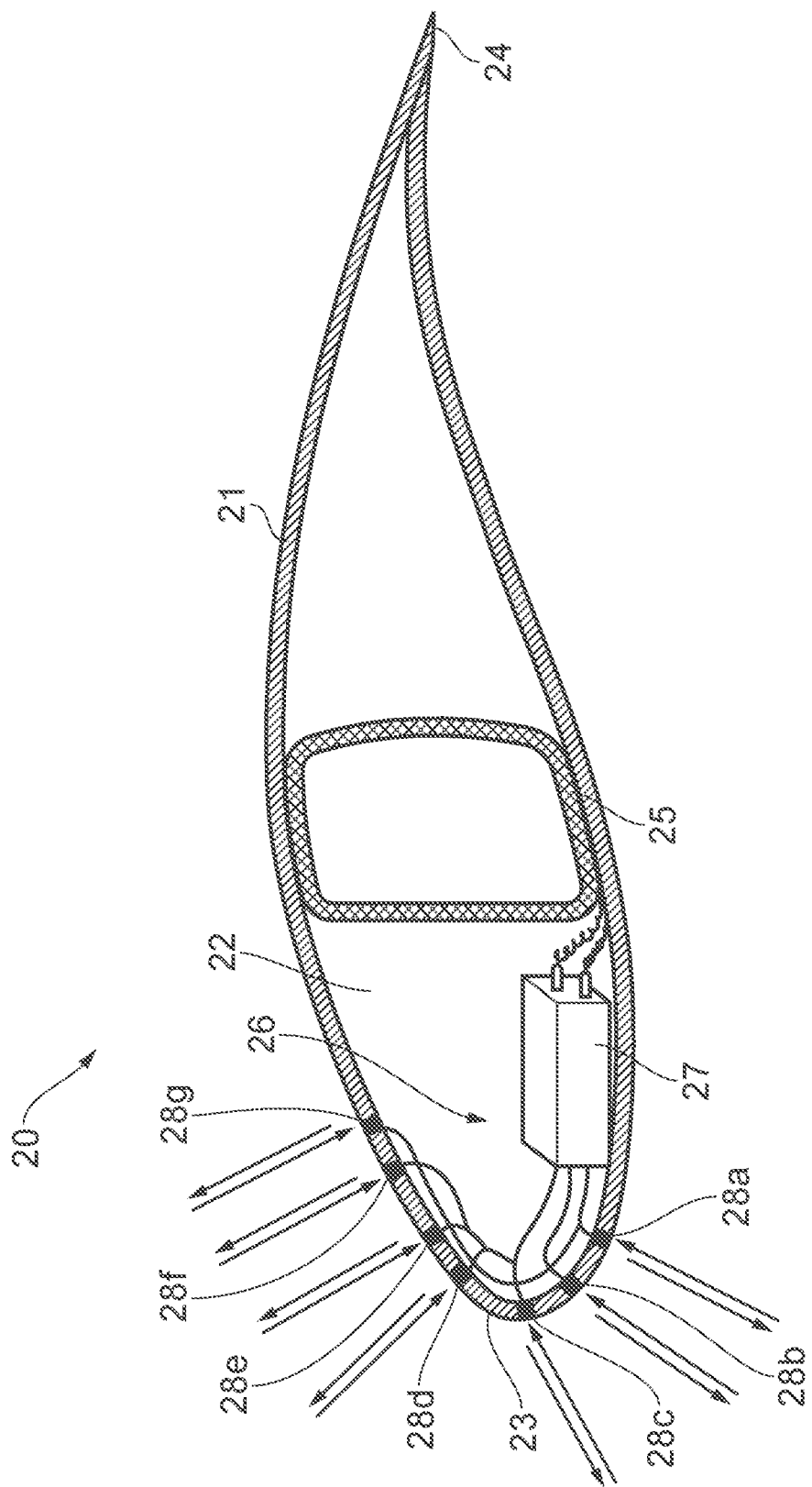
FIG. 2 is a cross-section view of a blade of the wind turbine of FIG. 1, in accordance with a first embodiment.

FIG. 2 shows a cross-section through a wind turbine blade 20 formed of a shell 21 which defines an outer surface of the blade and an inner volume 22, the inner volume being bound by an inner (or interior) surface of the shell 21. The section of blade 20 shown in FIG. 2 may be part of a main blade portion of the blade 20. The outer surface of the shell 21 defines an outer aerodynamic surface of the blade 20. The blade extends in a chordwise direction from a leading edge 23 to a trailing edge 24, and in a spanwise direction from a blade root attached to the turbine hub to a blade tip. A spar 25 extending in a spanwise direction within the volume 22 provides structural support to the shell 21.

The blade 20 comprises a LIDAR element 26 configured to transmit and receive LIDAR signals. The LIDAR signals may yield information about wind conditions ahead of the turbine, and may be used to control the turbine, as will be described in more detail below.

The LIDAR element 26 comprises a LIDAR controller 27 and a plurality of LIDAR systems 28a-g. It is noted that whilst the LIDAR controller 27 and some other elements of the LIDAR element 26 may be located within the volume bounded by the inner surface of the shell 21, at least part of the LIDAR systems 28a-g may be outside the volume bounded by the inner surface of the shell 21 but within a volume bounded by the outer aerodynamic surface of the blade 20. This can be seen clearly on FIG. 2.

Each LIDAR system 28a-g is disposed within a respective aperture in the shell 21 of the blade. The apertures may be through-holes, passing through the full thickness of the shell, or may be cavities, passing only through part of the thickness of the shell. The LIDAR systems 28a-g are configured to transmit light beams away from the blade 20, and to detect reflected light beams incident on the blade 20. In particular, the LIDAR systems 28a-g are arranged to detect light reflected from aerosols upstream of the turbine. Each LIDAR system 28a-g may be configured to transmit and detect LIDAR signals (i.e. each LIDAR system 28a-g may be a transceiver, or include a separate transmitter and receiver), or a sub-set of the LIDAR systems 28a-g may be configured to transmit LIDAR signals, and a further sub-set of LIDAR systems 28a-g may be configured to detect reflected light beams.

The LIDAR systems 28a-g may comprise continuous or pulsed LIDAR systems, or a combination of both. One or more LIDAR system 28a-g may be a Doppler LIDAR system, i.e. a LIDAR system configured to detect a change of wavelength between the transmitted and detected signals. The determination of the change of wavelength may be performed by the LIDAR controller 27. The speed of the wind along the direction of the transmitted and reflected LIDAR beam can be determined from the change in wavelength.

The LIDAR systems 28a-g may be configured to transmit and detect LIDAR signals having a wavelength between 1500 nm and 2000 nm, or between 1500 nm and 1600 nm, and more particularly a wavelength of 1550 nm. In an embodiment, each LIDAR system may be configured to transmit and detect light beams at a single angle. As such, the LIDAR systems may be cheap compared to more sophisticated LIDAR systems capable of transmitting/receiving at multiple different angles, or with a larger range of beam widths, or with a larger range of wavelengths.

The LIDAR systems 28a-g are connected to and controlled by LIDAR controller 27. LIDAR controller 27 in particular is configured to selectively activate each LIDAR system 28a-g to transmit a light beam, and to receive detected signals from the LIDAR systems 28a-g. In an embodiment, the LIDAR controller 27 may be configured to process detected signals to generate LIDAR measurement results, which may be used to control the turbine as described in more detail below. In some other embodiments, LIDAR controller 27 may function as a switch to activate selected LIDAR systems 28a-g. In this case, detected LIDAR signals may be processed in a main controller of the turbine (e.g. the control system as described above with reference to FIG. 1), which may then adjust operation of the turbine based on the detected signals. The LIDAR controller may be connected to the main controller of the turbine via a wired or wireless connection. The main controller may be located in a rotor hub of the wind turbine.

Each LIDAR system 28a-g is arranged to transmit and detect light beams at a different angle to every other LIDAR system 28-g. For example, the apertures containing the LIDAR systems 28a-g may be appropriately angled, or each LIDAR system 28a-g may be set at a specific angle within its associated aperture. In any case, by using a plurality of different LIDAR systems 28a-g, LIDAR measurements can be taken in multiple directions at once. LIDAR systems 28a-g may particularly be fixed systems, i.e. having a fixed direction of light transmission (and reception). Such systems may be more cost-effective than moveable LIDAR systems.

Additionally, providing multiple fixed LIDAR systems 28a-g in the blade allows changes in the pitch of the blade to be corrected or compensated for. The pitch of a blade is frequently adjusted during operation of the turbine, for example to maximise energy extraction from the incident wind. If a single fixed LIDAR system was used, the direction of transmission of the LIDAR signal (and, equivalently, direction of the reflected beam) would change with the pitch. As a result, different LIDAR measurements may not be comparable, and the LIDAR signal may not even be directed towards the incident air. Advantageously, by providing a blade with a plurality of LIDAR systems arranged along at least a leading edge portion of the blade and each directed at different angles, an alternative LIDAR system can be selected when the pitch changes to take LIDAR measurements at approximately the same position upstream of the turbine as before the pitch change.

In particular, when taking a LIDAR measurement, the turbine main controller and/or LIDAR controller may determine the pitch angle of the blade, select one or more appropriate LIDAR systems 28a-g to perform a LIDAR measurement, and activate the selected LIDAR systems 28a-g.

Although seven LIDAR systems 28 are shown in FIG. 2, any number of LIDAR systems may be used, including one. The LIDAR systems 28a-g are preferably positioned towards the leading edge region of blade 20, and may be distributed along the surface of the shell 21 in chordwise and/or spanwise directions. The LIDAR systems 28a-g may collectively cover and angular range of between 20° and 100°, or preferably 40°, in a vertical direction and between 0° and 80°, or preferably 50°, in a horizontal direction. It is noted that the terms "vertical" and "horizontal" assume an orientation of the blade as shown in FIG. 2.

Figure 3:
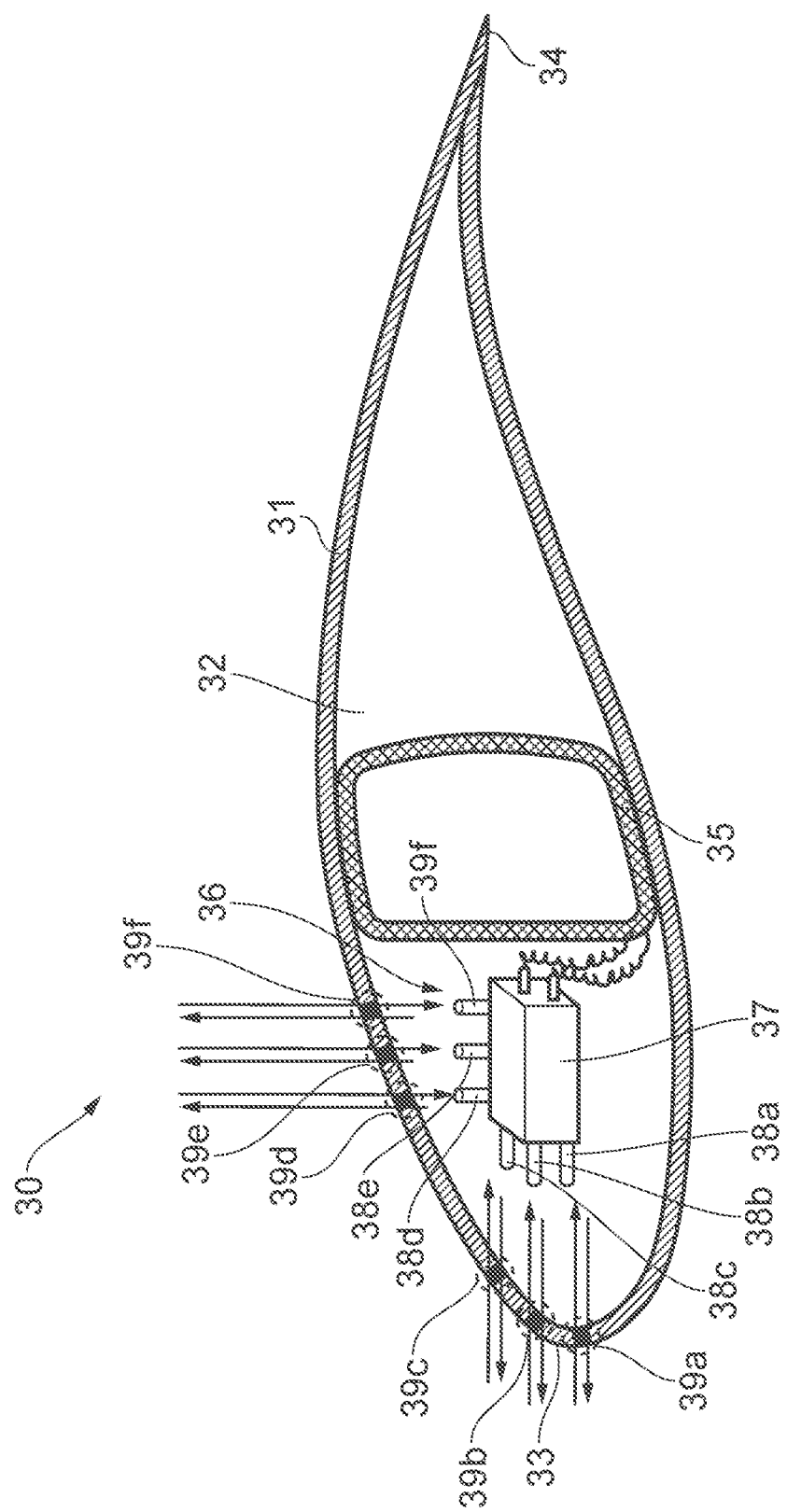
FIG. 3 is a cross-section view of a blade of the wind turbine of FIG. 1, in accordance with a second embodiment.

FIG. 3 shows a cross-section through an alternative example wind turbine blade 30, comprising a shell 31. Shell 31 comprises an outer surface and an inner surface. The inner surface of shell 31 defines an inner volume 32. Features 31-35 match the correspondingly numbered feature 21-25 of blade 20.

Blade 30 comprises a LIDAR element 36. LIDAR element 36 comprises a LIDAR controller 37 and a plurality of fixed LIDAR systems 38a-f, each configured to transmit and detect light similarly to LIDAR systems 28a-f. In contrast to the LIDAR systems 28a-f of blade 20, the LIDAR systems 38a-f are mounted within the inner volume 32, for example physically attached to the LIDAR controller 37, or contained within the same housing as LIDAR controller 37.

Each LIDAR system 38a-f is optically coupled to a corresponding aperture 39a-f passing through the thickness of the shell 31. Each aperture 39a-f contains an optically transparent material, the optically transparent material configured to allow LIDAR signals to pass into and out of the inner volume 32 of the blade 30. When a LIDAR system 38a-f transmits a light beam, it passes through the optically transparent material of the corresponding aperture 39a-f. The LIDAR systems 38a-f detect reflected light beams through the optically transparent material of the apertures 39a-f.

The optically transparent material may transmit light having a wavelength between 1400 nm and 2100 nm, or 1500 nm and 2000 nm, or between 1500 nm and 1600 nm. In particular, the transmittance of the optically transparent material at these wavelengths may be 0.7 or higher or 0.9 or higher.

The apertures may be through-holes, passing fully through the thickness of the shell 31; or may be cavities, passing only partly through the thickness of the shell 31. The optically transparent material may be formed integrally with the shell 31, or may be attached within the apertures 39a-f after formation of the shell 31.

In operation, LIDAR element 36 is similar to LIDAR element 26 of blade 20. The LIDAR controller 36 selectively activates the LIDAR systems 38a-f to transmit a light beam for a LIDAR measurement. Reflected light signals detected by the LIDAR systems 38a-f are communicated to the LIDAR controller 36 (or main controller of the turbine), which generates a result of the LIDAR measurement, which may in turn be used to control the turbine. As before, the LIDAR controller 36 may be a simple switch which selectively activates different ones of the LIDAR systems 38a-f based on control instructions from the main controller, and then passes detected light signals back to the main controller for processing. Alternatively, the LIDAR controller 36 may perform at least some processing of the detected light signals and then provide processed data to the main controller.

The LIDAR systems 38a-f each transmit light beams at a different angle to the other LIDAR systems 38a-f, so that a wide area ahead of the turbine can be measured. The LIDAR systems 38a-f may be spread in chordwise and/or spanwise directions within the volume 32, and any number of LIDAR systems 28a-f may be used. As described above in relation to FIG. 2, the LIDAR controller 36 or main turbine controller may select particular LIDAR systems 38a-f to be activated to compensate for changes in the pitch of the blade 20.

The LIDAR systems 38a-f are preferably positioned towards the leading edge region of blade 30, and the apertures 39a-f may be distributed along the surface of the shell 31 in chordwise and/or spanwise directions. As before, the LIDAR systems 38a-f with the apertures 39a-f may collectively cover and angular range of between 20° and 100°, or preferably 40°, in a vertical direction and between 0° and 80°, or preferably 50°, in a horizontal direction. Also, as shown in FIG. 3, the LIDAR systems 38a-f with the apertures 39a-f may collectively cover a smaller angular range of about 90 degrees in a vertical direction. It is noted that the terms "vertical" and "horizontal" assume an orientation of the blade as shown in FIG. 3.

Figure 4:
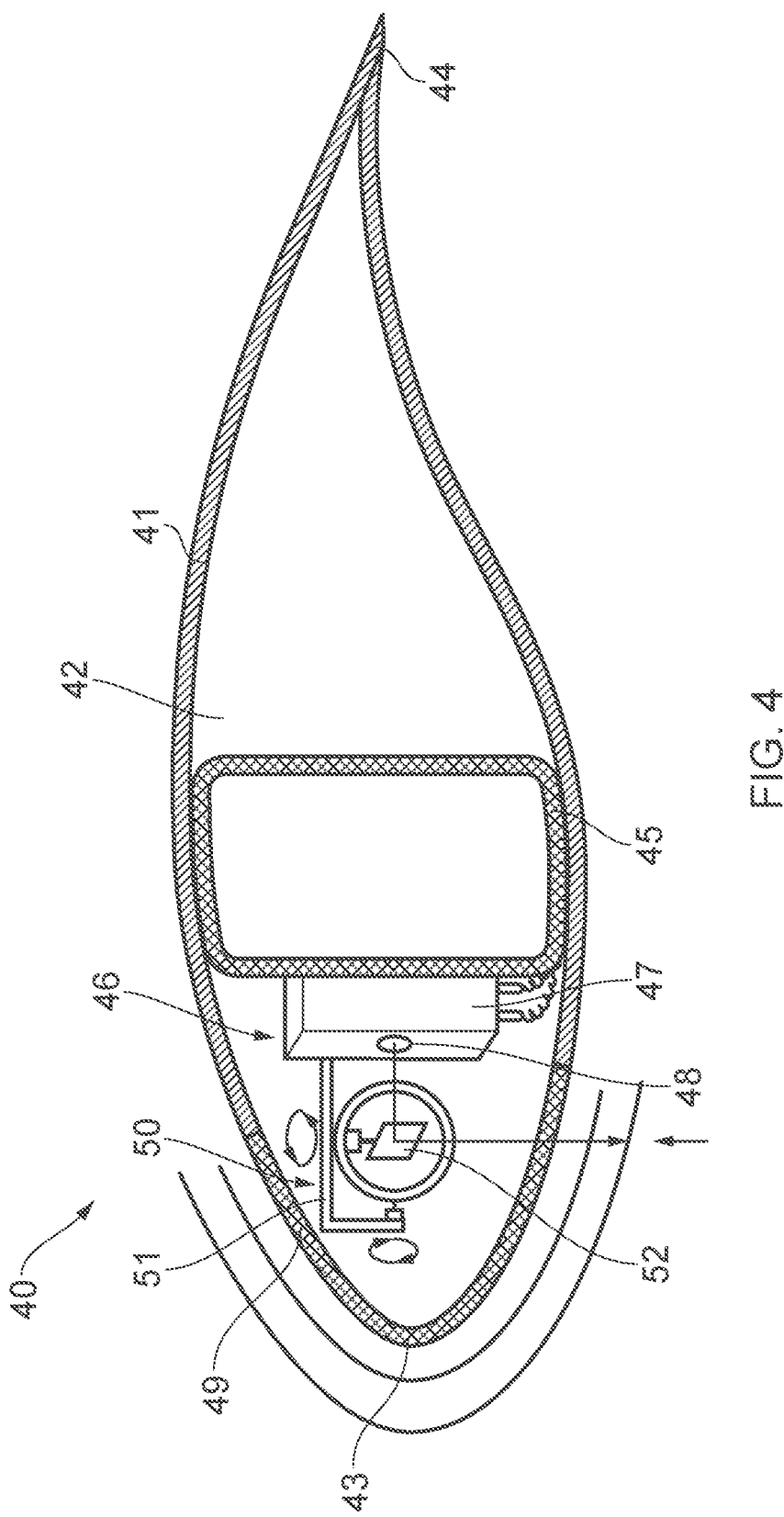
FIG. 4 is a cross-section view of a blade of the wind turbine of FIG. 1, in accordance with a third embodiment.

In FIGS. 2 and 3, the LIDAR element 26, 36 were fixed in position, so that light beams could only be transmitted along pre-determined angles. FIG. 4 shows an alternative example of a blade 40, comprising a moveable LIDAR element 46. Features 41-45 of blade 40 match the correspondingly numbered features 21-25 of blade 20.

LIDAR element 46 comprises a LIDAR controller 47 and a LIDAR system 48, the LIDAR system 48 controlled by the LIDAR controller 47 and configured to transmit and detect LIDAR signals. In the illustrated embodiment, the LIDAR system 48 is shown to be integral with the LIDAR controller 47, but in other embodiments the LIDAR system 48 may be positioned anywhere within the volume 42.

An aperture 49 is formed through the shell 41 across a large part of (or a majority of) a region around the leading edge 43 of the blade 40. The chordwise spread of the aperture 49 may span a majority of the shell forwards of the spar 45. The angular span of the aperture 49 may be approximately 100°, for example spanning from +90° upwards to −10° downwards relative to the forwards direction of the leading edge 43.

The aperture 49 contains an optically transparent material, similar to that contained by apertures 39a-f in blade 30.

LIDAR signals can be transmitted from the LIDAR system 48, and through the optically transparent material to perform a LIDAR measurement. Reflected light beams can pass through the optically transparent material to be detected by the LIDAR system 48 to complete the LIDAR measurement. Preferably the LIDAR system comprises a transceiver, configured to transmit and detect LIDAR signals, but in alternative embodiments separate transmitting and detecting LIDAR systems may be used.

The aperture 49, and optically transparent material, may span a large part (or a majority of) the spanwise length of the leading edge 43. Alternatively, the spanwise width of the aperture 49 and optically transparent material may be between 0.1 and 1 m. Alternatively, the spanwise spread of the aperture 49 may span by a similar amount to the chordwise span. As such, the aperture may have a generally circular or oval shape and cover only an area of the leading edge region which is adjacent (e.g. within Y meters, wherein Y is 0.1, 0.5, 1, 2, etc.) of the LIDAR system 48. However, in some other embodiments, different shapes may be used, such as, for example, square, rectangular, or irregular. The blade 40 may comprise a plurality of apertures 49, each containing optically transparent material (which may be the same or different in each aperture). The plurality of apertures 49 may be distributed along the leading edge 43, for example from blade tip to blade root. Each aperture may be associated with a corresponding one of a plurality of LIDAR elements 46, similarly distributed along the blade 60 from tip to root.

The LIDAR element 46 further comprises a beam steering element 50. The beam steering element is configured to deflect the light beam generated by the LIDAR system 48 to transmit the light along a selected angle with respect to the LIDAR system 48 (and, equivalently, to deflect reflected LIDAR signals from that selected angle back to the LIDAR system 48). The beam steering element 50 may be adjusted to select the angle at which light will be transmitted. Thus light from the fixed LIDAR system can be transmitted from the blade 40 at a plurality of angles. Preferably, the LIDAR controller 46 or main turbine controller is configured to control the beam steering element 50. In particular, the LIDAR controller or main turbine controller may adjust the angle at which light beams are transmitted from the blade 40 to perform a plurality of LIDAR measurements at different angles. The results of the LIDAR measurements may then be used to control the turbine, as described below. In an embodiment, the size and shape of the aperture 49 may be selected so that light can be transmitted and reflected through the aperture 49 at each angle that the beam steering element 50 is capable of covering.

In the illustrated embodiment, beam steering element 50 comprises a reflector 52 (e.g. a mirror), positioned in the path of the light beams transmitted by the LIDAR system 48 and configured to deflect the light beams to the intended angle; and an actuator 51 configured to change the position of the reflector 52. The actuator 51 particularly comprises a gimbal mount, arranged to pivot the reflector 52 in a plurality of planes.

The actuator may comprise one or more motors, for example stepper motors, controllable by the LIDAR controller 48 or main turbine controller to change the position of the reflector 52.

The LIDAR element 46, or particular components of the LIDAR element 46, may advantageously be attached to the spar 45 to avoid applying weight onto the shell 42. Alternative positions within the volume 42 may also be used. That is, parts of the LIDAR element 46 may be attached to the inner surface of the shell 41.

In the embodiment of FIG. 4, a single LIDAR system 48 is shown; however, in at least some other embodiments, multiple LIDAR systems may be provided to function as above with the reflector 52. Also, it is to be understood that, in addition to controlling the beam steering element 50, the LIDAR controller 48 is operable to selectively activate and deactivate the LIDAR system 48.

Figure 5:
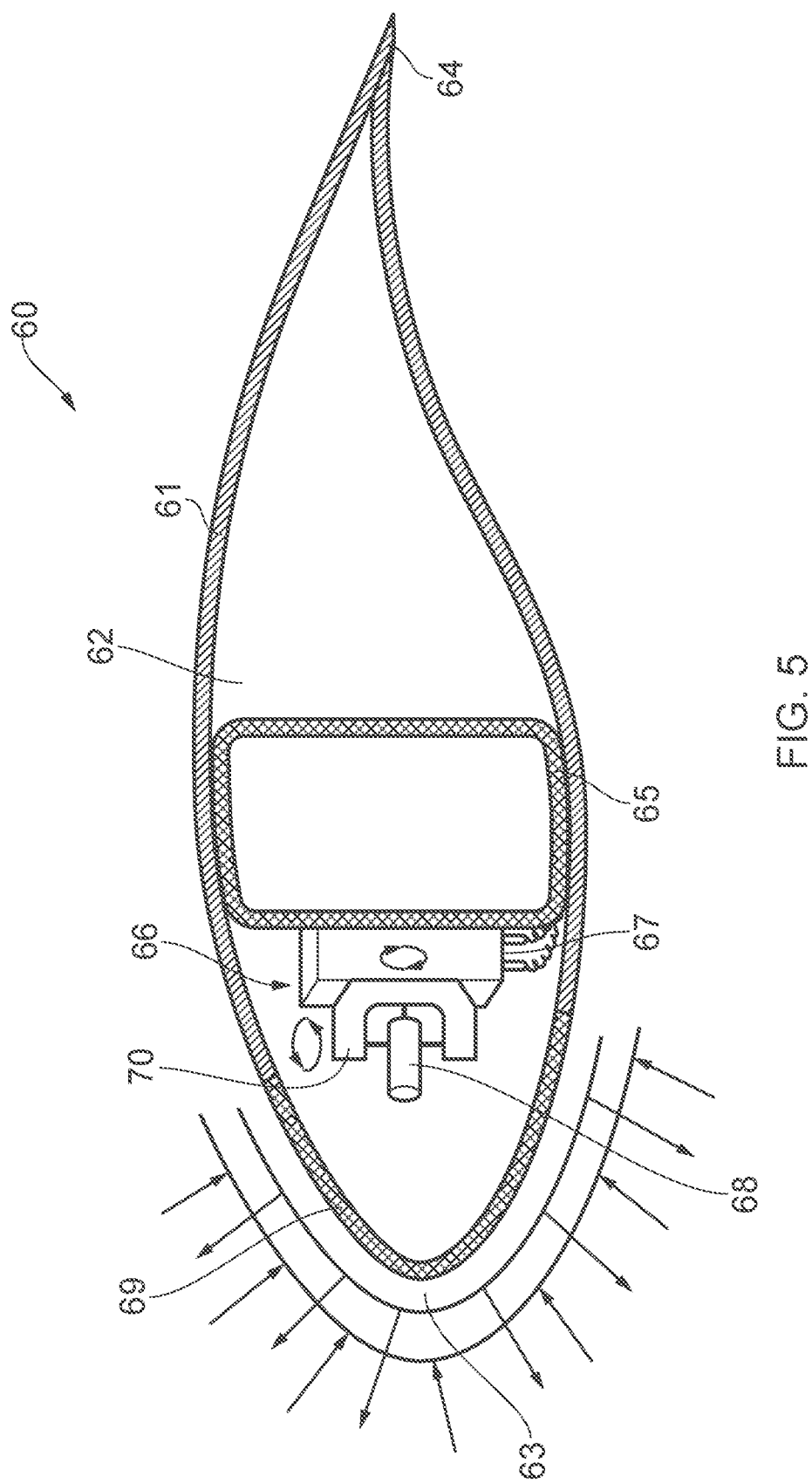
FIG. 5 is a cross-section view of a blade of the wind turbine of FIG. 1, in accordance with a fourth embodiment.

FIG. 5 shows an alternative example of a blade 60 comprising a moveable LIDAR element 66. Features 61-65 of blade 60 match the correspondingly numbered features 21-25 of blade 20.

LIDAR element 66 comprises a LIDAR controller 67 and LIDAR system 68, the LIDAR system 68 controlled by the LIDAR controller 67 and configured to transmit and detect LIDAR signals, similar to the LIDAR systems described above (separate transmitting and detecting LIDAR systems may also be used, as described above). An aperture 69 in the leading edge region of the blade 60 contains an optically transparent material similar to that contained by aperture 49 described above.

Unlike the blades described above, the LIDAR system 68 of LIDAR element 66 is directly moveable to direct light beams in a desired direction (rather than using a reflector to change the direction of the beam as in blade 40). The LIDAR system 68 is coupled to an actuator 70 which is operable to move the LIDAR system 68. For example, the actuator 70 may be configured to rotate the LIDAR system 68 in one or more planes of rotation. The actuator 70 may preferably be controlled by the LIDAR controller 67 to direct the light transmitted from the LIDAR system 68 along a desired direction. By controlling the direction of transmitted light, the LIDAR controller 67 may perform a number of LIDAR measurements in a plurality of directions, the results of which may be used to control the turbine as described below.

In the embodiment of FIG. 5, a single LIDAR system 68 is shown; however, in at least some other embodiments, multiple LIDAR systems may be provided to function as above with the actuator 70. Also, it is to be understood that, in addition to controlling the actuator 70, the LIDAR controller 67 is operable to selectively activate and deactivate the LIDAR system 68.

Figure 6:
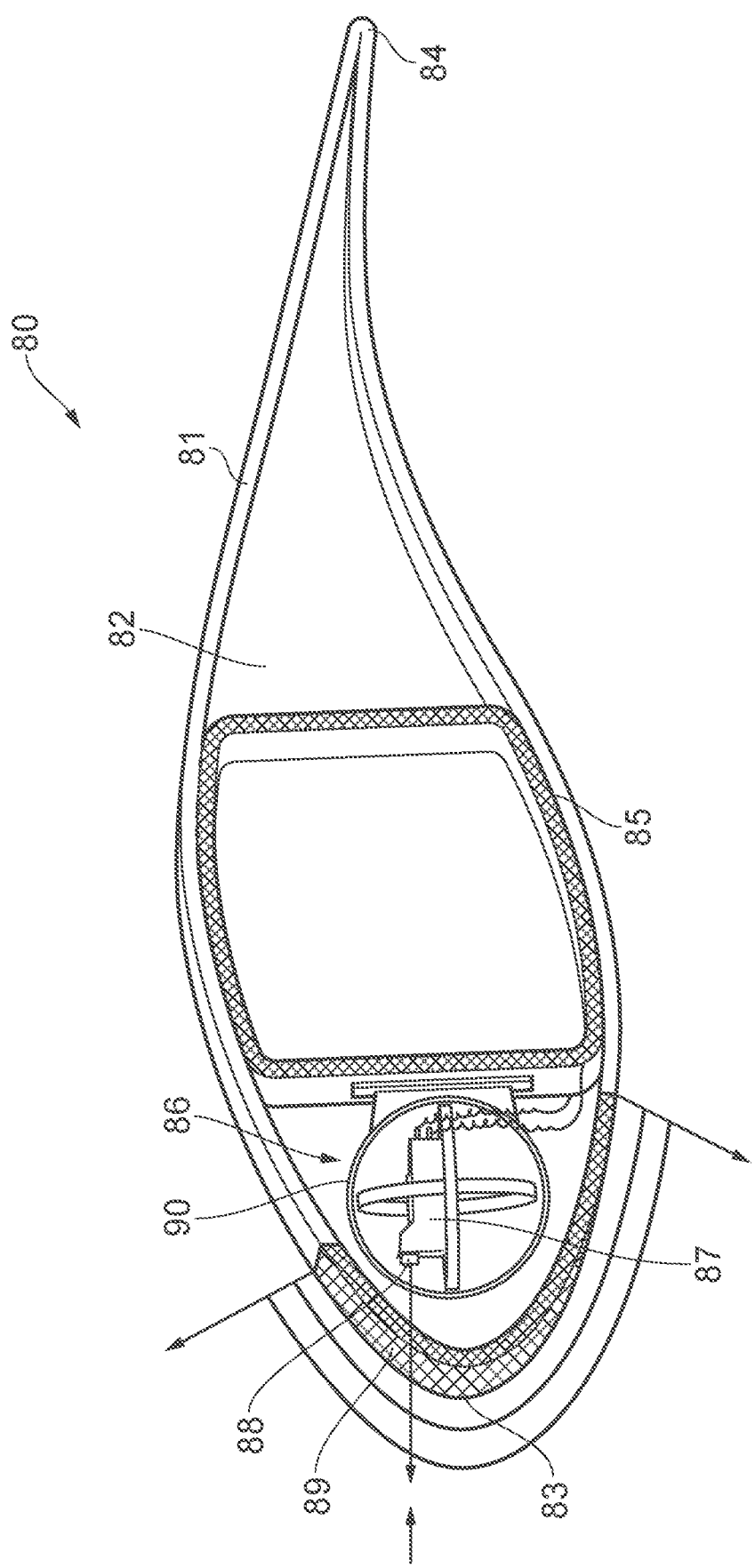
FIG. 6 is a cross-section view of a blade of the wind turbine of FIG. 1, in accordance with a fifth embodiment.

FIG. 6 shows an alternative blade 80. Blade 80 is similar to blade 60. In particular, features 81-89 correspond to features 61-69 of blade 60.

In blade 80, both the LIDAR controller 87 and LIDAR system 88, which may be integrated with one another, are mounted within a gyroscopic housing 90, which itself is mounted within the inner volume 82, for example to spar 85. The gyroscopic housing 90 is free to rotate in three planes, and thus maintains the orientation of the LIDAR system 88 relative to the ground, even as the blade 60 moves. In this way, the direction of transmission (and detection) of LIDAR signals stays constant. The gyroscopic housing 90 provides a passive mechanism which automatically corrects (or compensates) for movement of the blade 60, such as changes in pitch of the blade, vibrations caused by the impact of the wind, rotation about the rotor hub, bending, or twisting. The main turbine controller (or LIDAR controller) thus does not need to actively correct (or compensate) for pitch changes. In an embodiment, either no LIDAR controller 87 is provided, or the LIDAR controller 87 comprises a simple switch to activate or deactivate the LIDAR system 88.

In the embodiment of FIG. 6, a single LIDAR system 88 is shown; however, in at least some other embodiments, multiple LIDAR systems may be provided within the gyroscopic housing 90.

The embodiments described above each comprise a single LIDAR element per blade. However, any of the above embodiments may instead comprise multiple LIDAR elements (each comprising one or more LIDAR systems). The LIDAR elements may be of the same type, or of different types. For example, a blade may contain one or more fixed LIDAR system such as those described in relation to FIG. 1; and a movable LIDAR system such as that described in FIG. 4. The multiple LIDAR elements may be distributed within the blade from tip to root, and/or from leading edge to trailing edge. For example the LIDAR elements may be located within the first 5-10 m from the root of the blade. Such a position may protect the LIDAR elements from lightning strikes, as well as making them more easily accessible for servicing.

Figure 7:
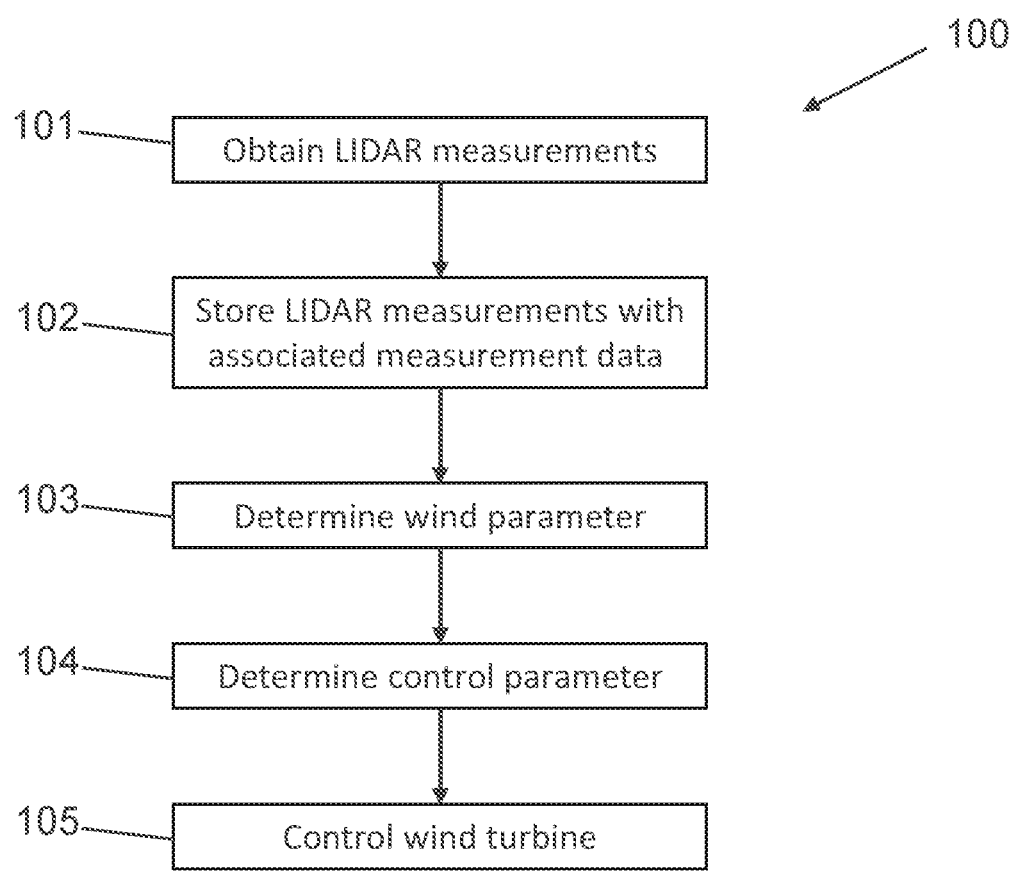
FIG. 7 is a flow diagram illustrating a method of controlling a wind turbine, in accordance with an embodiment.

The LIDAR measurements obtained by wing-mounted LIDAR elements, such as those described above, may be used to control the wind turbine, for example to optimise operation of the turbine. FIG. 7 illustrates a method 100 of controlling a wind turbine based on LIDAR measurements.

In block 101, LIDAR measurements are obtained. The LIDAR measurements provide information about aerosols in the air upstream of the turbine, as would be familiar to the person skilled in the art. For example, the LIDAR measurement may comprise a Doppler shift in the frequency of a light beam reflected from a particle in the air (e.g. an aerosol). The LIDAR measurements are obtained in accordance with one or more measurement parameters, which may specify for example the frequency at which measurements are taken, the distance upstream of the turbine at which the measurement is to be taken, the measurement time, the LIDAR system focal distance, the measurement vertical location, the measurement horizontal location, and/or the LIDAR system transmission/detection angle. In an embodiment, the distance upstream of the turbine at which the measurement is to be taken may be derived from the LIDAR system focal distance. Additionally, the measurement vertical location and/or the measurement horizontal location may be derived from the LIDAR system transmission/detection angle in combination with the LIDAR system focal distance. The LIDAR measurements may be measurements performed by any of the LIDAR elements described above.

As described above, to obtain the LIDAR measurements the LIDAR system may be moved, or a different LIDAR system selected, to account for changes in the pitch of the blade. Accordingly, block 101 may comprise the steps of determining a pitch angle of one or more of the blades, determining the measurement parameters (e.g. LIDAR system transmission/detection angle) based on the determined pitch angle, and controlling an angle at which one or more LIDAR systems transmit and detect light beams based on the measurement parameters to compensate for blade pitch angle.

At block 102, the LIDAR measurements are stored with associated measurement data, such as the time at which the measurement was taken, the distance of the measurement location from the turbine, the LIDAR system focal distance, the measurement vertical location, the measurement horizontal location, the LIDAR system transmission/detection angle, blade position, blade pitch angle, distance of the LIDAR system from blade root or blade tip, distance of the LIDAR system from blade leading or trailing edge, identification of the measuring LIDAR system (where a plurality of LIDAR systems are present), rotor yaw angle, and/or the pitch angle of the respective blade when the LIDAR measurement was performed. At least some of this measurement data may be determined by the main controller of the wind turbine. Additionally, this main controller may include one or more sensors which are located on the wind turbine and are configured to monitor variables used in determining the measurement data. The LIDAR measurements and measurement data may be stored on a local storage device, for example part of the main controller of the turbine, or may be transmitted to and stored on an external storage device.

At block 103, a wind parameter is determined based on the stored LIDAR measurements and associated measurement data. The wind parameter is indicative of a property of the wind upstream of the wind turbine. For example, the wind parameter may be wind speed, wind direction, wind sheer, and/or wind veer.

The wind parameter may be determined for a particular measurement distance. In particular, the measurement data may be used to select only LIDAR measurements having a measurement distance within a predefined distance range. Alternatively or additionally, only LIDAR measurements obtained within a predefined time window may be used when determining the wind parameter. Where pulsed LIDAR elements are used, selecting a time window may select a distance range for the LIDAR measurements.

At block 104, a control parameter of the wind turbine is determined based on the wind parameter. The wind parameter provides an indication of the wind conditions upstream of the turbine. The wind conditions that the wind turbine will experience in the near future (e.g. 5-60 seconds in the future) can be predicted based on the wind conditions upstream. In a simple example, the future wind conditions at the turbine may be assumed to be the same as the wind conditions currently experienced upstream of the turbine. The control parameter defines a property of turbine operation, such as a pitch angle of one or more blades. For example, the control parameter may be determined to optimise energy extraction from the wind given the expected wind conditions; and/or may be determined to minimise a load experienced by the turbine or components of the turbine.

At block 105, the wind turbine is controlled according to the control parameter. For example, where the control parameter defines a value for a pitch of a blade, the blade pitch may be adjusted to that value.

The method 100 may then return to block 101 and be performed again. In particular, the method 100 may be performed repeatedly, for example continuously or periodically.

In one embodiment, a wind turbine may comprise a single LIDAR element in one blade, the single LIDAR element comprising only one LIDAR system for transmitting a single LIDAR beam in a fixed direction. Such an arrangement may be cheaper than other LIDAR systems. LIDAR measurements may be obtained by the LIDAR element as the blade rotates, for example at multiple points during a rotation. As a fixed LIDAR, LIDAR measurements will thus be obtained for positions around the circumference of a circle, each taken at a fixed measurement distance from the turbine.

The time taken for a complete rotation of the turbine may vary, but may typically take approximately 3 to 8 seconds. This means that there can be up to 4 seconds between two measurements on opposite sides of the circle. If the wind speed or wind direction changes during this time there will be some inaccuracies in the measurements. To compensate for that some filtering may be used. For example, the LIDAR measurement or wind parameter may be averaged over a certain period, such as 10-60 seconds. Such a period may be fast enough to be used for controlling the turbine. The measurements obtained may be used as a reference for adjusting signals from other wind measurement systems on the turbine, and for power curve verifications—i.e. verifying the predicted power curve for the turbine or wind farm to confirm whether or not the full potential of the turbines is realised, and to have a better estimate of the expected earnings from the turbines.

Thus even simple implementations of the blade-based LIDAR of the present disclosure may provide sufficient information to improve operation of a wind turbine.

However, for more accurate measurements of upstream wind conditions, a plurality of LIDAR beams may be used. For example, two or more of the blades of the turbine may comprise a respective LIDAR element, and/or LIDAR elements with multiple LIDAR systems for transmitting multiple LIDAR beams may be used.

Figure 8:
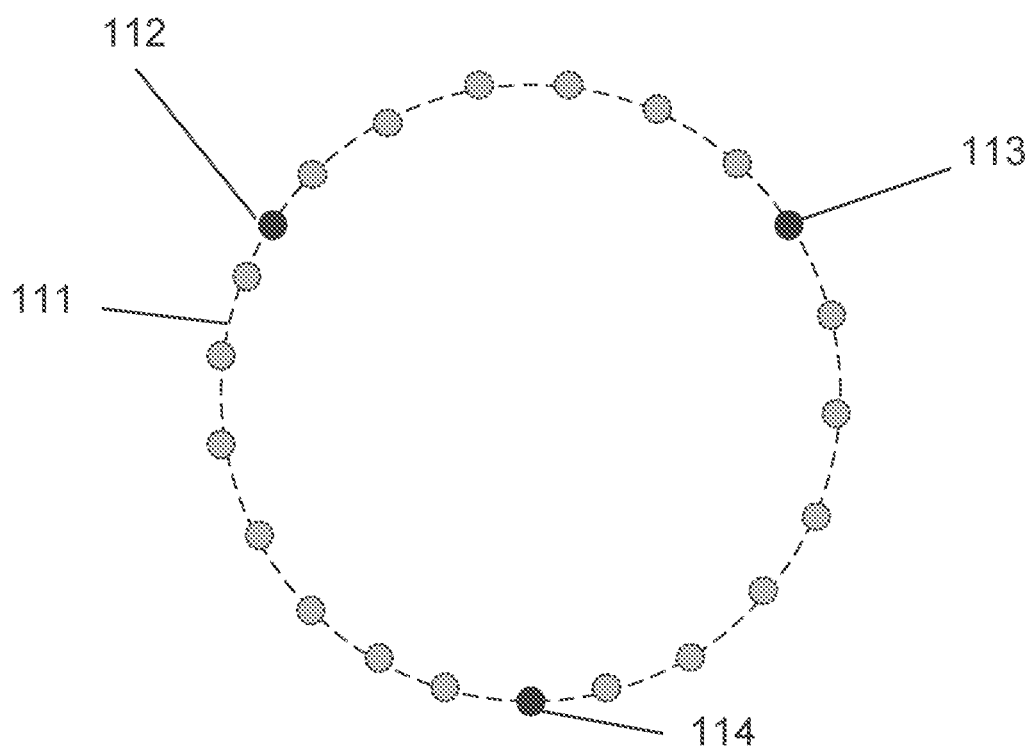
FIG. 8 is a schematic diagram illustrating measurement points of a measurement circle corresponding to the method of FIG. 7.

FIG. 8 illustrates the LIDAR measurements that may be taken by a three-blade turbine as part of method 100, where each blade comprises a single-beam LIDAR element. In this example, each LIDAR element has the same focus distance, so that the LIDAR measurements are obtained in a fixed measurement plane at a predetermined measurement range from the turbine. Each LIDAR element transmits a LIDAR beam in the same direction. Thus LIDAR measurements are obtained at points on a circle 111 in the measurement plane. For example, measurement point 112 is obtained by a LIDAR element in a first blade, measurement point 113 is obtained by a LIDAR element in a second blade, and measurement point 114 is obtained by a LIDAR element in a third blade. As the measurements 112-114 are obtained substantially simultaneously, the three highlighted points 112-114 are each separated by an angle 120°. Taking substantially simultaneous measurements with the LIDAR element of each blade may be advantageous, as it allows measurements from multiple points spread across a wide area to be compared for a single point in time.

It is to be noted that a similar pattern of LIDAR measurements may be obtained by a single LIDAR element with three LIDAR systems in one blade, each LIDAR system arranged to direct a LIDAR beam in a different direction to the other LIDAR systems. However, using separate single-beam LIDAR elements in each blade may be less costly.

Using three LIDAR elements in this way means that many more LIDAR measurements can be taken per turbine rotation. For example, over 100 measurements may be taken for each rotation. This large number of measurement points allows the wind parameter to be determined in block 103 of method 100 with greater accuracy. Hence the turbine can be controlled using more accurate information.

Furthermore, with this large number of measurement points it is possible to determine if any measurements were affected by irregularities. For example, measurements may be affected by the wake of upstream turbines or complex terrain/geography (e.g. hills, mounds, troughs, valleys, etc.). The apparent wind conditions measured by such LIDAR measurements may not actually reach the downstream turbine, and so these measurements may not be useful in determining the control parameter. Alternatively, the apparent wind conditions measured by such LIDAR measurements may be too unpredictable to be useful in the determination of the control parameter. In any case, by identifying and filtering out irregular measurements, control of the turbine may be further optimised for the actual conditions experienced. Such filtering of outlier measurements is described in more detail below.

Figure 9:
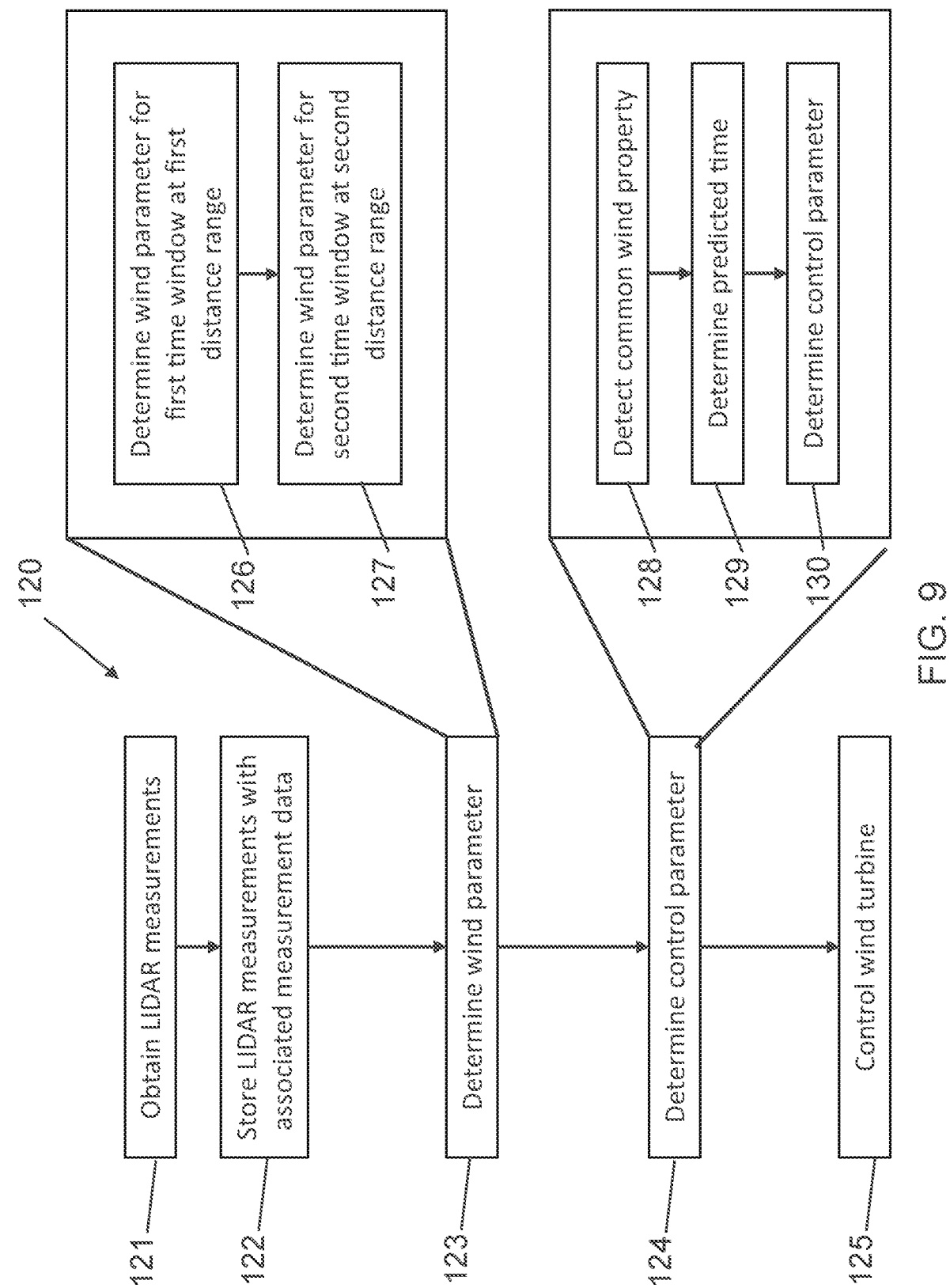
FIG. 9 is a method of controlling a wind turbine to handle an approaching wind property (e.g. a wind gust)

FIG. 9 illustrates an alternative method 120 of controlling a wind turbine. Method 120 may be used to control a turbine based on an incoming wind property, such as a gust. At block 121, LIDAR measurements are obtained. In this embodiment, the LIDAR measurements comprise measurements at two or more different measurement distances. For example, a first fixed LIDAR element may obtain LIDAR measurements at a first measurement distance, and a second fixed LIDAR element may obtain LIDAR measurements at a second measurement distance. Alternatively, a single LIDAR element with multiple fixed LIDAR systems may be used, or a single LIDAR element with an adjustable focus distance may be used.

At block 122, the LIDAR measurements are stored along with associated measurement data, similarly to block 102 of method 100 described above.

At block 123, a wind parameter is determined based on the stored LIDAR measurements and associated measurement data. In this embodiment, determining the wind parameter comprises determining the wind parameter for a first time window and a first distance range at block 126; and determining the wind parameter for a second time window at a second distance range at block 127. In particular, the second distance range may be less than the first distance range (i.e. closer to the turbine), and the second time window may be later than the first time window. In other words, the wind parameter is determined for a first point further away from the turbine; and a second point closer to the turbine, but later in time. Thus any changes or patterns in the wind parameter as air flows towards the turbine can be identified. The first distance range may for example be twice the size of the second distance range. Determining the wind condition for the first or second time window may comprise filtering a plurality of received LIDAR measurements with an appropriate time window, and determining the wind condition using the filtered measurements.

At block 124, a control parameter is determined based on the wind parameter. In this embodiment, determining the control parameter comprises detecting, at block 128, a common wind property of the wind upstream of the turbine based on the first and second values of the wind parameter. At block 129 a predicted time of arrival of the wind property at the turbine is determined. For example, the time at which a gust may arrive at the turbine may be predicted. In an embodiment, the time of arrival may be determined based on whether the wind property is detectable in the second value of the wind parameter, or based on changes in the wind property between the first and second values of the wind parameter. At block 130, the control parameter is determined based on the predicted time of arrival. For example, the control parameter may select a change in the pitch of a blade to account for the imminent arrival of a strong gust at the turbine. Finally, at block 125, the wind turbine is controlled in accordance with the determined control parameter.

As an example, the common wind property may be a strong gust. The gust may be detected at the first measurement range as a heightened wind speed. The wind speed and wind direction of the gust may be measured. A certain time later, the increase in wind speed may be detected by a LIDAR system measuring at second measurement range, which may again record wind speed and wind direction. As the first and second measurement ranges are known, and the time taken for the gust to travel from the first measurement range to the second measurement range is known, the speed of approach of the gust towards the turbine can be calculated. Assuming the speed of approach remains constant, the time for the gust to travel from the second measurement range to the turbine itself can then be estimated using the speed of approach and known distance between the turbine and second measurement range. Hence the arrival time of the gust at the turbine can be estimated.

Figure 10:
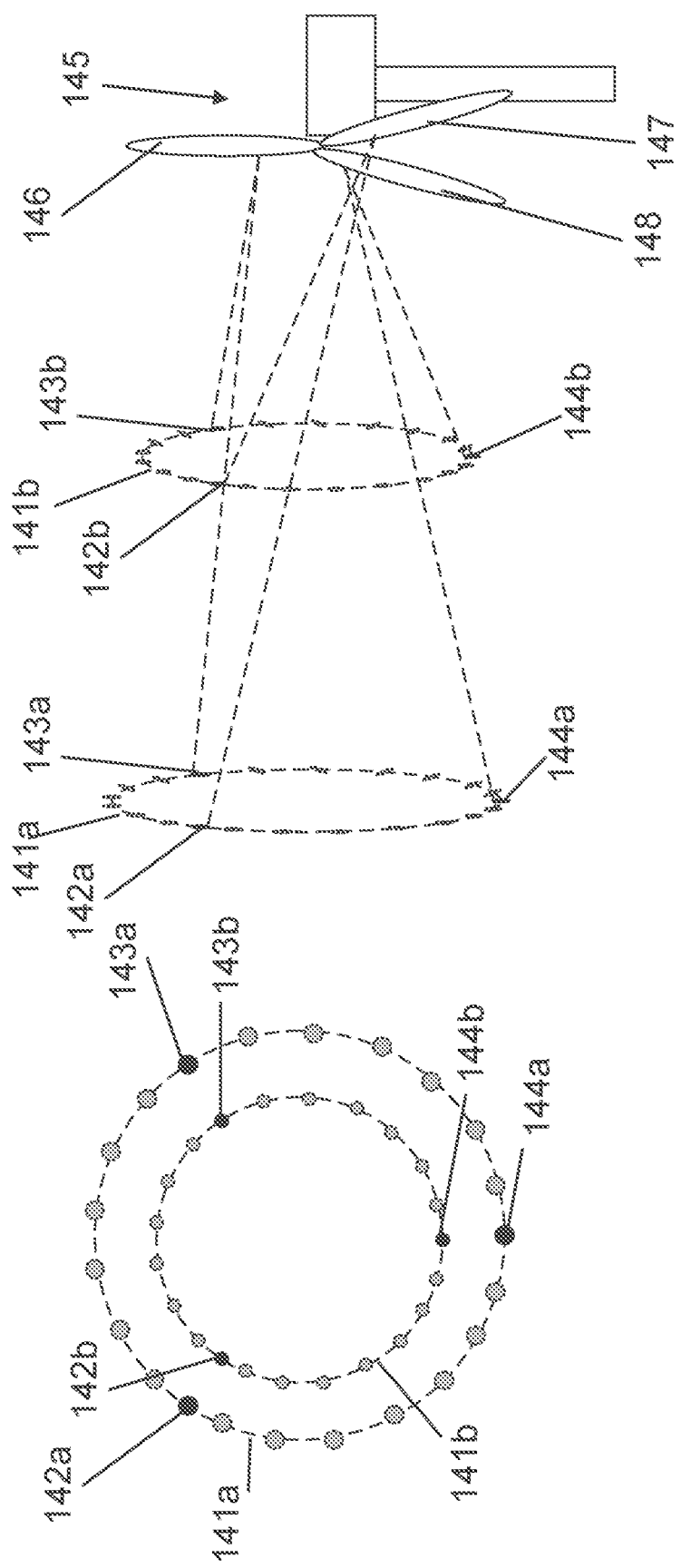
FIGS. 10A and 10B are schematic diagrams illustrating measurement points of measurement circles corresponding to the method of FIG. 9.

FIGS. 10A and 10B illustrate the LIDAR measurements that may be taken by a three-bladed turbine 145 when performing method 120. Each blade 146-148 of the turbine 145 comprises a LIDAR element. Each LIDAR element comprises a first LIDAR system, configured to perform a respective LIDAR measurement 142*a*, 143*a*, 144*a* at a first distance from the turbine. As with the LIDAR measurements in FIG. 8, LIDAR measurements 142*a*, 143*a*, 144*a* are located on the circumference of a measurement circle 141*a*, in a first measurement plane. In contrast to the embodiment shown in FIG. 8, in this embodiment the LIDAR element of each blade 146-148 also comprises a second LIDAR system. Each second LIDAR system is configured to perform a respective LIDAR measurement 142*b*, 143*b*, 144*b*. LIDAR measurements 142*b*, 143*b*, 144*b* are located on the circumference of a second measurement circle 141*b*, in a second measurement plane.

As can be seen most clearly in FIG. 10B, LIDAR measurements 142*a*, 143*a*, 144*a* are responsive to wind conditions further upstream of the turbine than the LIDAR measurements 142*b*, 143*b*, 144*b*. The LIDAR measurements 142*a*, 143*a*, 144*a* can be used to determine the wind parameter for the first distance range in block 126 of method 120; the LIDAR measurements 142*b*, 143*b*, 144*b* can be used to determine the wind parameter at the second distance range in block 127 of method 120.

As with the measurements in FIG. 8, the LIDAR elements of each blade take multiple measurements during each rotation of the turbine. In a typical example, more than 100 measurements may be taken by the turbine in a single rotation, providing information about wind conditions along the full circumference of measurement circles 141*a*, 141*b*.

In the illustrated embodiment, the radius of the second measurement circle 141*b* is smaller than that of the first measurement circle 141*a*—i.e. the second LIDAR system of each blade is directed to transmit LIDAR beams in a different direction to that of the first LIDAR system, as well as having a different focus distance. In other embodiments, the second measurement circle 141*b* may have an equal radius or a larger radius than the first measurement circle 141*a*.

In further embodiments, one or more of the LIDAR elements in the blades may comprise three or more LIDAR systems, the additional LIDAR systems configured to perform LIDAR measurements at a third distance range from the turbine. Using such a turbine, a wind parameter may be determined for a third time window at a third distance range from the turbine, increasing the accuracy of the identification of the common wind property and predicted time or arrival.

In alternative embodiments, the LIDAR element in one or more of the blades may be moveable to adjust the measurement location from the first distance range to the second distance range, rather than using two LIDAR systems to obtain measurements at the two distance ranges. In particular, the focus distance of the LIDAR element may be adjustable to adjust the measurement location.

Figure 11:
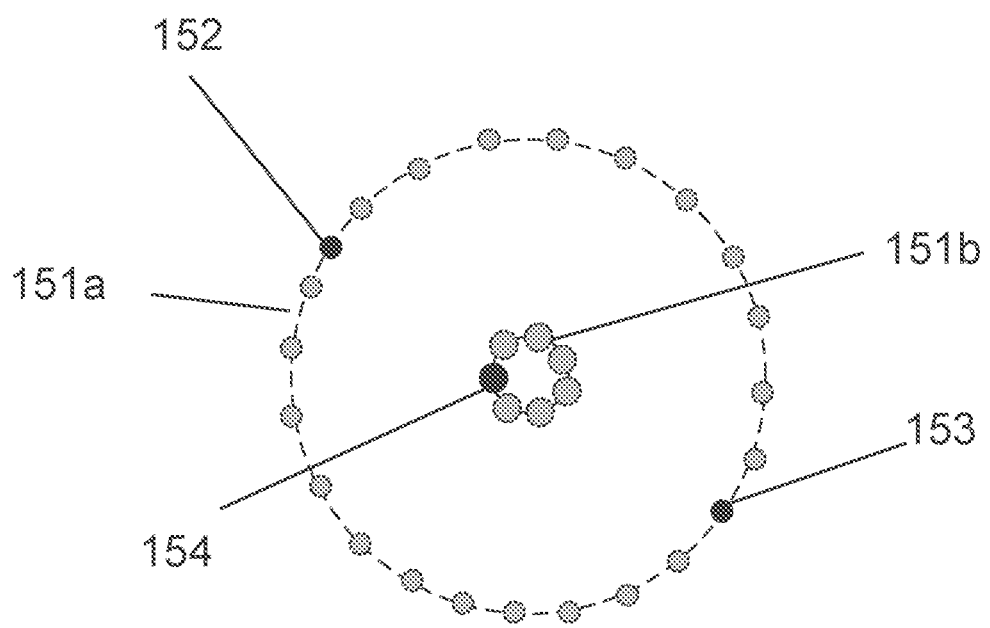
FIG. 11 is a schematic diagram illustrating alternative measurement points of measurement circles corresponding to the method of FIG. 9.

FIG. 11 shows an alternative LIDAR measurement arrangement that may be used to perform method 120. In this case, a three blade turbine comprises a LIDAR element in each blade, each LIDAR element comprising a single, fixed LIDAR system. The LIDAR systems of two of the blades are arranged to obtain LIDAR measurements 152, 153 at a first distance range (by setting their focus distances to the first distance range). LIDAR measurements 152, 153 lie on the circumference of a first measurement circle 151, similar to first measurement circle 141*a* of FIG. 10. The LIDAR system of the remaining third blade is arranged to obtain a LIDAR measurement 154 at a second distance range. The LIDAR measurement 154 lies on the circumference of a second measurement circle 151*b*, similar to second measurement circle 141*b* in FIG. 10. As the blades rotate, a plurality of measurements are obtained around each measurement circle 151*a*, 151*b*; these measurements may be used to determine a wind condition at a first and second distance range (and first and second time window), as described above.

In the illustrated embodiment, the LIDAR measurements 152, 153 of the first measurement circle 151*a* are separated by 180°, despite the blades themselves being separated by 120°. This may be achieved by setting a direction of the LIDAR beams transmitted by the respective LIDAR systems of these blades to select a separation of 180°. Such a separation maximises the distance between the two measurements 152, 153, and so may be advantageous for providing an indication of a wind condition across a large measurement plane. The LIDAR system responsible for obtaining the third LIDAR measurement 154 on the second measurement circle 151*b* may be set to control the radius of the second measurement circle 151*b*, which may be smaller than the radius of the first measurement circle 151*a* (as in the illustrated example), or of equal size or larger.

LIDAR elements comprising only one fixed LIDAR system may be cheaper than those with multiple LIDAR systems and/or moveable LIDAR systems. Thus the arrangement shown in FIG. 11 may be a more cost effective approach to implementing method 120 than that shown in FIGS. 10A and 10B. However, reducing the number of LIDAR systems taking measurements in each measurement circle reduces the number of measurements taken per revolution for that measurement circle. This may reduce the information available for determining a wind condition. For example, it may not be possible to identify where sectors of the air are disrupted by irregularities such as wake from upstream turbines, such as described in more detail below.

Figure 12:
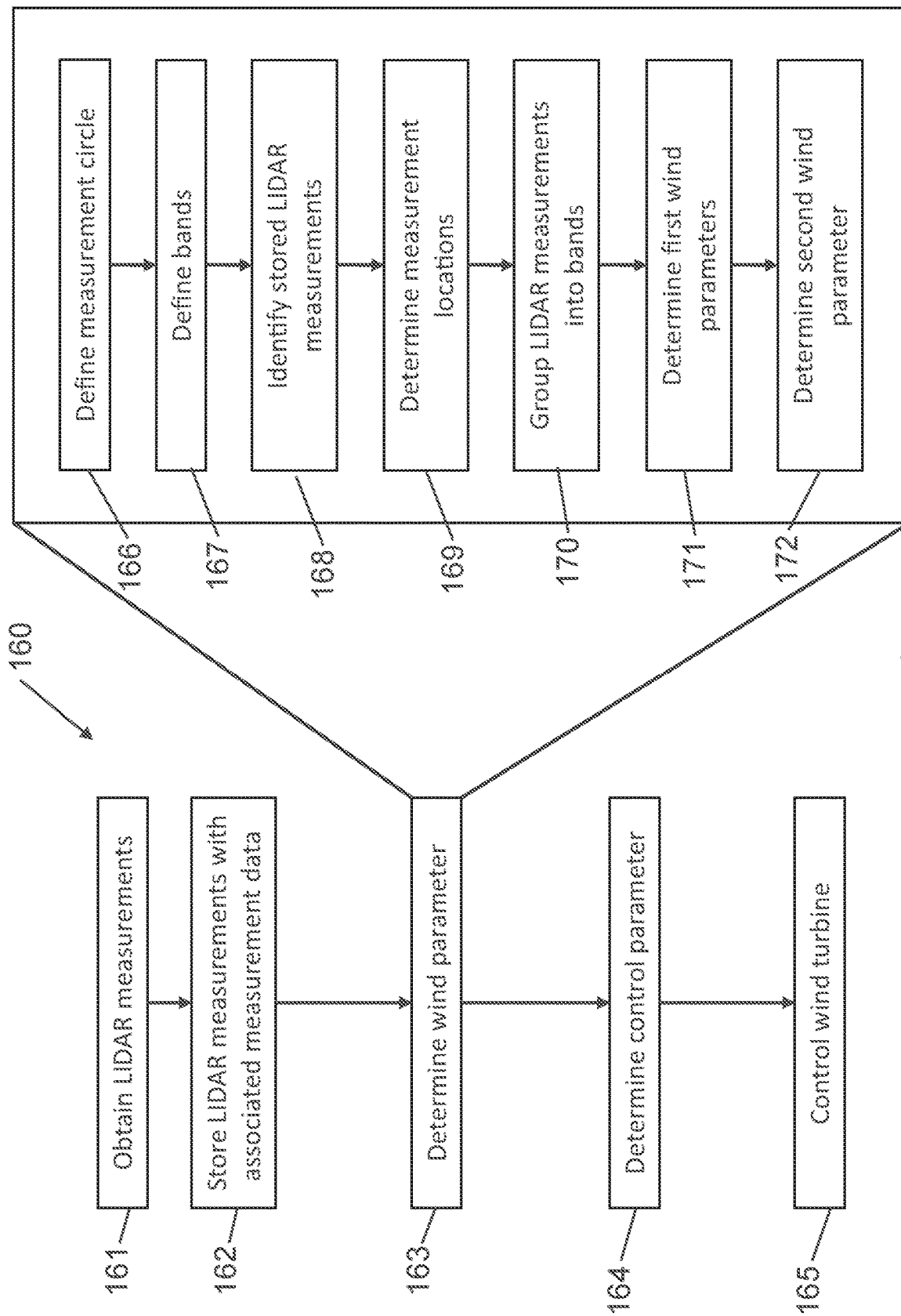
FIG. 12 is a method of controlling a wind turbine, in accordance with another embodiment.

FIG. 12 illustrates a further example of a method 160 of controlling a wind turbine. Blocks 161-165 match blocks 101-105 of method 100, from obtaining LIDAR measurements in block 161 to controlling the wind turbine in block 165. Blocks 161-165 may generally incorporate any of the method blocks described above. Blocks 166-172 define an example method of the block 163 of determining the wind parameter. Blocks 166-172 of method 160 may be understood most clearly with reference to FIG. 13.

Having obtained and stored LIDAR measurements, a measurement circle is defined. The measurement circle corresponds to a circle of rotation of the blades, and is spaced a predefined measurement distance ahead of the wind turbine (i.e. a measurement range from the turbine). Measurement circles 141*a* and 141*b* in FIGS. 10A and 10B are examples of measurement circles which may be defined.

Figure 13:
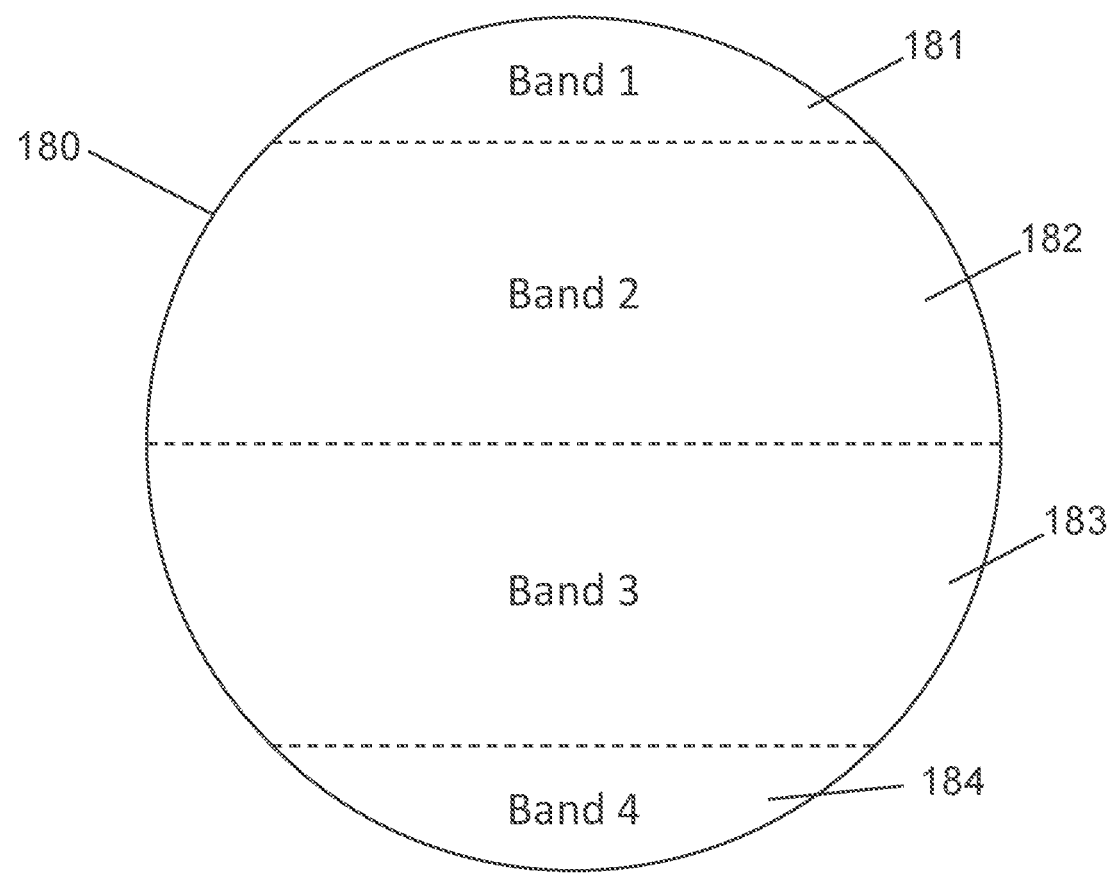
FIG. 13 is a schematic diagram illustrating a measurement circle corresponding to the method of FIG. 12.

At block 167, a plurality of bands are defined in the measurement circle. Such a division of a measurement circle into bands is shown in FIG. 13. In this figure, four measurement bands 181-184 are defined within a measurement circle 180 (but any number of bands may be used). Each band 181-184 encloses a range of vertical locations contained within the measurement circle 180. In an embodiment, each possible vertical location within the measurement circle 180 is defined in a single band.

At block 168, LIDAR measurements are selected which lie within the measurement circle—i.e. LIDAR measurements are selected which have the same measurement distance as that selected for the measurement circle. This may comprise identifying stored LIDAR measurements which were taken by LIDAR systems set to an appropriate focus distance. For pulsed LIDAR, this may comprise applying a time filter window to LIDAR measurements to select data corresponding to the predefined measurement distance. The measurement locations may be on the circumference of the measurement circle and/or enclosed by the measurement circle. In an embodiment, measurements within a certain range (e.g. within X meters, wherein X is an integer, such as, 2, 5, 10, etc.) of the predefined measurement distance are considered.

At block 169, a measurement location within the measurement circle is determined for each identified LIDAR measurement, using the measurement data associated with each of the LIDAR measurements (for example using the transmission direction the LIDAR system was obtained the respective LIDAR measurement).

At block 170, the identified LIDAR measurements are grouped within the defined bands according to their respective determined measurement locations. For example, measurements may be grouped into one of the four bands 181-184 shown in FIG. 13. At block 171, a first wind parameter is determined for each band based on only the identified LIDAR measurements and associated measurement data for that band. The first wind parameter may for example be wind speed or wind direction.

At block 172, a second wind parameter is determined based on the first wind parameters. In particular, the second wind parameter may be determined based on a difference between first wind parameters. The second wind parameter may be a derivative of the first wind speed parameters with respect to height. Using the example illustrated in FIG. 13, the wind speed for each of the bands 181-184 may be determined. If the wind speed is found to vary between the bands 181-184—i.e. to vary with height, then a wind shear may be identified. Similarly, if a wind direction is found to vary between the bands 181-184, a wind veer may be identified.

Having determined the second wind parameter, the method 160 proceeds to the block 164 of determining a control parameter, which may comprise determining a control parameter based on the first wind parameters and/or second wind parameter. The turbine is controlled according to the control parameter in block 165. For example, where the second wind parameter is wind shear, the control parameter may enable shear cycle pitching. High wind shears may result in increased tilt moments which can increase rotor fatigue. Enabling the shear cycle pitching may reduce these tilt moments before they get too large. Similarly, pitch can be adjusted to minimise the effects of wind veer. In this case the angle of attack will be different when a blade is pointed upwards compared to when the blade is pointed downwards. The determined wind shear or wind veer may also be used in power curve verification, to disregard or compensate for data recorded during periods of wind shear or wind veer.

In the illustrated embodiment, the measurement circle is divided into horizontal bands, grouping LIDAR measurements based on height. In alternative examples, the measurement circle may be divided into vertical bands, grouping LIDAR measurements based on horizontal distance across a measurement plane, or into bands aligned along an angle to the vertical direction (e.g. between 30° and 60° to vertical). In further examples, the measurement circle may be divided into sectors.

Figure 14:
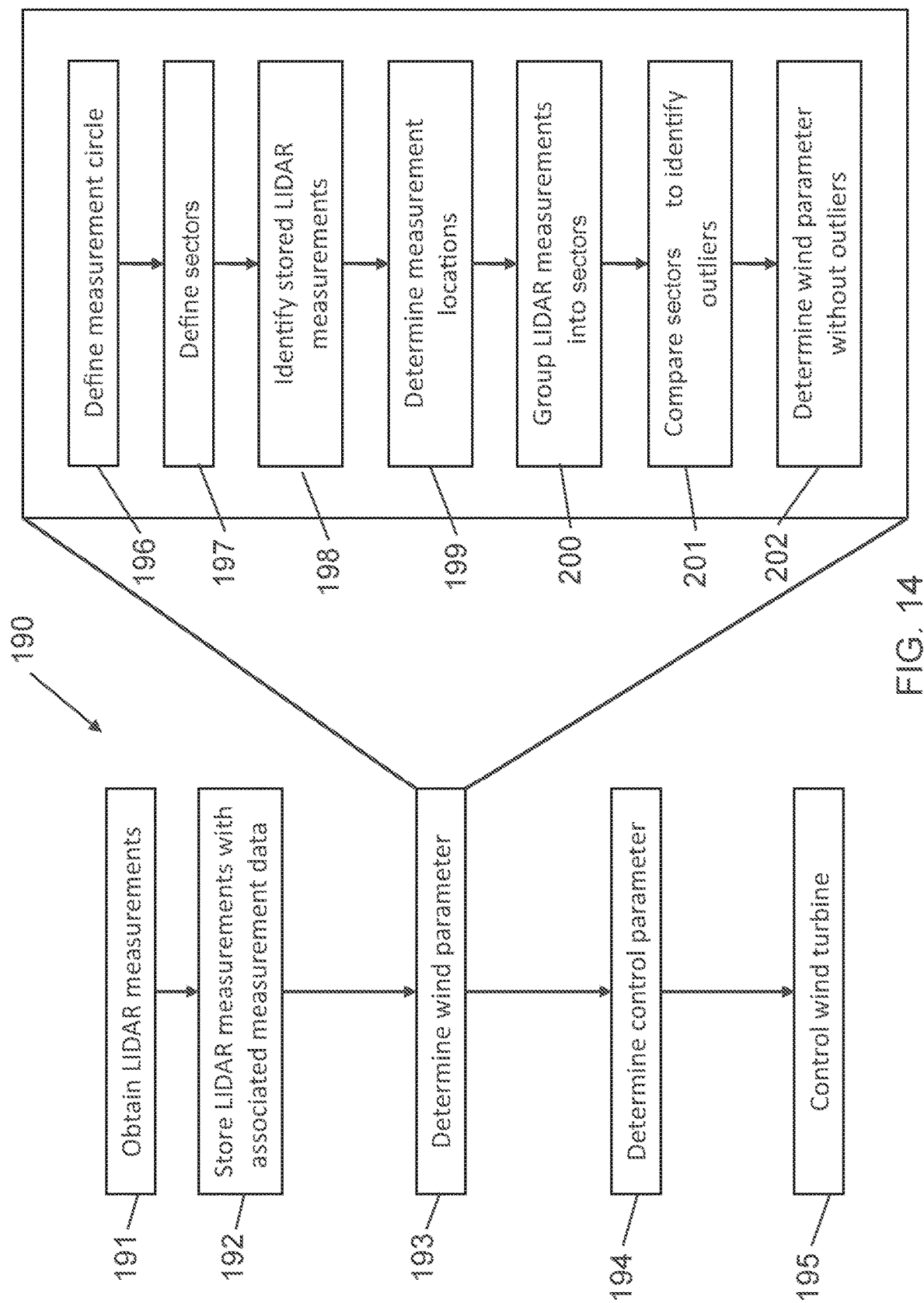
FIG. 14 is a method of controlling a wind turbine, in accordance with a further embodiment.

FIG. 14 illustrates a method 190 of controlling a wind turbine, in which LIDAR measurements are grouped into sectors of a measurement circle. By grouping measurements in this way, irregularities in the measurements may be identified and ignored or corrected for.

Blocks 191-195 of method 190 match blocks 101-105 of method 100, from obtaining LIDAR measurements in block 191 to controlling the wind turbine in block 195. Blocks 191-195 may generally incorporate any of the method blocks described above. Blocks 196-202 define an example method of the block 193 of determining the wind parameter.

Figure 15:
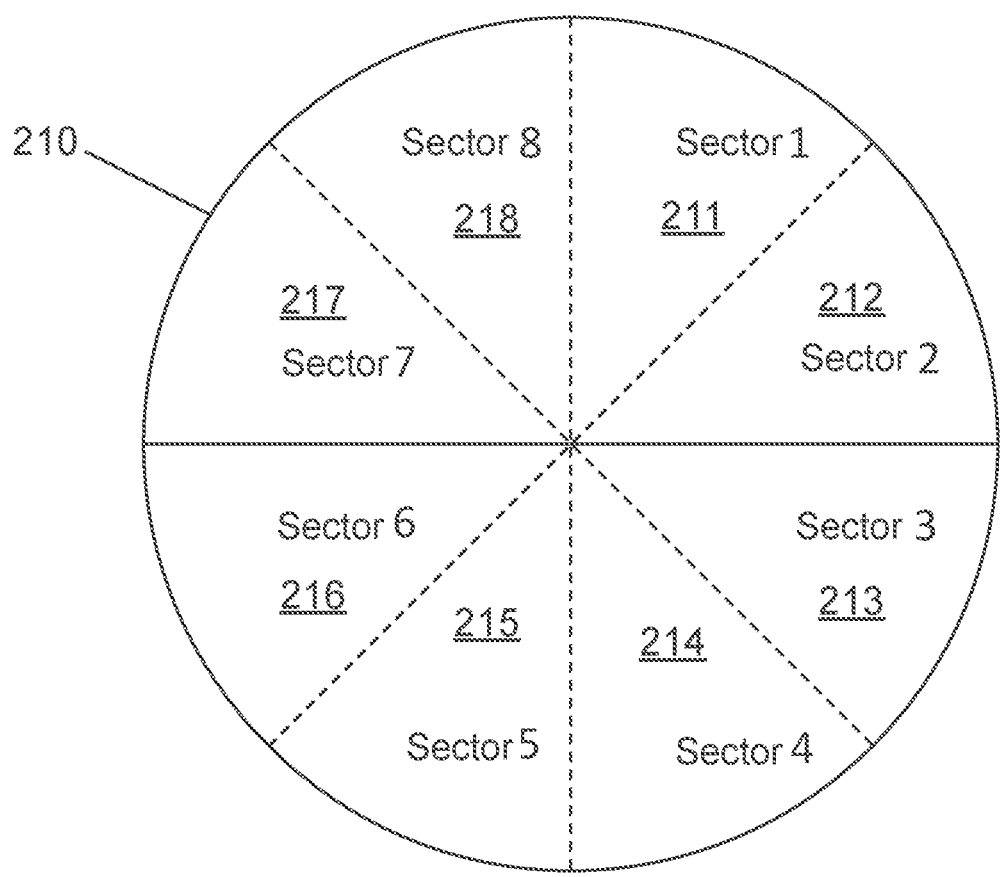
FIG. 15 is a schematic diagram illustrating a measurement circle corresponding to the method of FIG. 14.

Method 190 may be understood most clearly with reference to FIG. 15.

Having obtained and stored LIDAR measurements, a measurement circle is defined, similarly to block 166 of method 160.

At block 197, a plurality of sectors are defined within the measurement circle, each sector defining a different set of locations within the measurement circle. In the example shown in FIG. 15, eight sectors 211-218 are defined within measurement circle 210 (but other numbers of sectors may be used). In an embodiment, each sector may cover 10 degrees of the measurement circle such that 36 sectors are required to cover the whole measurement circle.

At block 198, LIDAR measurements which correspond to the predefined distance of the measurement circle from the turbine are identified, similarly to identifying LIDAR measurements in block 168 of method 160.

At block 199, a measurement location within the circle is determined for each identified LIDAR measurement, based on the measurement data associated with the respective LIDAR measurement, as in block 169 of method 160. The measurement locations may be on the circumference of the measurement circle and/or enclosed by the measurement circle.

At block 200, the identified LIDAR measurements are grouped according to the plurality of sectors based on the determined measurement locations. In the example of FIG. 15, each identified LIDAR measurement is associated with one of the sectors 211-218 based on the measurement location of that LIDAR measurement.

At block 201, the LIDAR measurements of the different sectors are compared to identify whether any sectors contain outlier measurements. For example, LIDAR measurements for a sector or an average of LIDAR measurements for a sector may be compared to threshold values. The threshold values may define an expected range for the LIDAR measurements. If the measurements (or average) for a sector fall outside of the expected range, that sector may be identified as containing outliers. In an embodiment, the LIDAR measurements (or an average) of one sector may be compared to the LIDAR measurements (or an average) of one or more other sectors (e.g. each other sector). Based on these comparisons it is possible to identify differences between the LIDAR measurements of different sectors. Based on these differences, outlier data may be identified. For example, the differences may be compared to a threshold, and a sector may be considered to contain outlier data if it is associated with multiple differences above the threshold.

The outliers may be caused for example by wake from upstream turbines or complex terrains. The wind conditions due to these effects may have dissipated by the time the air reaches the downstream turbine, and so do not affect the performance of that turbine. If a control parameter was determined based on all measurements, including those affected by irregularities, turbine control would be adapted for conditions it will not experience. To avoid this, at block 202 LIDAR measurements in the outlier sectors are excluded when the wind parameter is determined. Thus the control parameter can be determined in block 194 independently of the outlier measurements. Additionally or alternatively, the outlier sectors may be excluded from future LIDAR measurements—i.e. no measurements are taken for locations within the outlier sectors in future measurement runs. This exclusion may be temporary, for example for a predefined amount of time, or permanent, e.g. where a geographical feature will always affect measurements in that sector.

The effectiveness of the turbine control provided by method 190 may be improved by taking more LIDAR measurements per turbine rotation. For example, the measurement arrangements shown in FIGS. 8 and 10A and 10B, with three LIDAR systems performing measurements on the same measurement circle, may be particularly suited for obtaining measurements for method 190.

In the above-described embodiment, sectors containing outlier LIDAR measurements are identified so that they can be discounted from subsequent wind parameter calculations. However, in at least some other embodiments, outlier LIDAR measurements may be stored or used by the control system in subsequent calculations. For example, a log of the outlier LIDAR measurements could be maintained by the wind turbine control system so that past and present outlier data can be compared. Also, if the outlier data is caused by the wake of an upstream wind turbine in the same wind farm, the operation of the upstream wind turbine may be controlled based on the outlier data so that the downstream wind turbine can be operated more efficiently.

Any of the methods described above may be performed by the main controller or control system of the turbine. The elements of any of the methods may be combined. For example, the method may comprise both the blocks 126-130 of method 120 for determining a control parameter based on a common wind property; and the blocks 192-202 for isolating outlier measurements.

Although the invention has been described above with reference to one or more preferred embodiments where features of one or more embodiments can also apply to other embodiments, it will be appreciated that various changes or modifications may be made without departing from the scope of the invention as defined in the appended claims.

The invention claimed is:

1. A wind turbine blade comprising a main blade portion and a light detection and ranging (LIDAR) element, the main blade portion having a shell defining an outer aerodynamic surface of the wind turbine blade, wherein the shell comprises at least one aperture extending at least partly through a thickness of the shell, and the LIDAR element being disposed within a volume bounded by the outer aerodynamic surface and comprising a plurality of LIDAR systems configured to transmit light beams away from the wind turbine blade and to detect reflected light beams incident upon the wind turbine blade, the plurality of LIDAR systems operatively coupled to a controller, the plurality of LIDAR systems being disposed such that each LIDAR system is operable to transmit and detect light beams at a different angle to each other LIDAR system, the controller being operable to selectively activate one or more of the plurality of LIDAR systems based on a change in a pitch of the wind turbine blade.

2. The wind turbine blade of claim 1, wherein each of the plurality of LIDAR systems are disposed at least partly within a respective aperture.

3. The wind turbine blade of claim 1, wherein the at least one aperture contains an optically transparent material.

4. The wind turbine blade of claim 3, wherein the plurality of LIDAR systems are disposed within a volume bounded by an inner surface of the shell and are positioned to transmit and detect light beams through the optically transparent material.

5. The wind turbine blade of claim 3, wherein the optically transparent material comprises a material through which the light beams transmitted by the one or more of the plurality of LIDAR systems pass without interference.

6. The wind turbine blade of claim 3, wherein the at least one aperture comprises an aperture covering a portion of a leading edge region of the main blade portion, the leading edge region being adjacent the one or more of the plurality of LIDAR systems.

7. The wind turbine blade of claim 1, wherein one or more of the plurality of LIDAR systems is configured to transmit and detect light beams at a single angle.

8. The wind turbine blade of claim 1, wherein one or more of the plurality of LIDAR systems is a pulsed Doppler LIDAR system or a continuous-wave Doppler system.

9. The wind turbine blade of claim 1, wherein one or more of the plurality of LIDAR systems is positioned at a leading edge region of the main blade portion.

10. The wind turbine blade of claim 1, further comprising one or more additional LIDAR elements, wherein the LIDAR element and each additional LIDAR element is positioned at a different location between a root and a tip of the wind turbine blade.

11. A wind turbine blade, comprising:
a main blade portion having a shell defining an outer aerodynamic surface of the wind turbine blade, wherein the shell comprises at least one aperture extending at least partly through a thickness of the shell; and
a light detection and ranging (LIDAR) element disposed within a volume bounded by the outer aerodynamic surface and comprising a plurality of LIDAR systems configured to transmit light beams away from the wind turbine blade and to detect reflected light beams incident upon the wind turbine blade, the plurality of LIDAR systems being disposed such that each LIDAR system is operable to transmit and detect light beams at a different angle to each other LIDAR system, wherein one or more of the plurality of LIDAR systems is selectively activated based on a change in a pitch of the main blade portion.

12. A wind turbine, comprising:
a tower;
a nacelle disposed on the tower;
a rotor extending from the nacelle and having a plurality of blades disposed at a distal end thereof, wherein at least one of the blades of the plurality of blades, comprises:
a main blade portion having a shell defining an outer aerodynamic surface of the blade, wherein the shell comprises at least one aperture extending at least partly through a thickness of the shell; and
a light detection and ranging (LIDAR) element disposed within a volume bounded by the outer aerodynamic surface and comprising a plurality of LIDAR systems configured to transmit light beams away from the blade and to detect reflected light beams incident upon the blade, the plurality of LIDAR systems being disposed such that each LIDAR system is operable to transmit and detect light beams at a different angle to each other LIDAR system; and a controller configured to selectively activate one or more of the plurality of LIDAR systems based on a change in a pitch of the main blade portion.

\* \* \* \* \*